US010842177B2

(12) United States Patent
Taylor et al.

(10) Patent No.: US 10,842,177 B2
(45) Date of Patent: Nov. 24, 2020

(54) ENERGY AND SPACE SAVING DEHYDRATOR

(71) Applicants: Michael W. Taylor, Williamstown, MA (US); Warren Taylor, Williamstown, MA (US)

(72) Inventors: Michael W. Taylor, Williamstown, MA (US); Warren Taylor, Williamstown, MA (US)

(73) Assignee: Michael W. Taylor, Williamstown, MA (US)

( * ) Notice: Subject to any disclaimer, the term of this patent is extended or adjusted under 35 U.S.C. 154(b) by 23 days.

(21) Appl. No.: 16/285,557

(22) Filed: Feb. 26, 2019

(65) Prior Publication Data

US 2019/0261656 A1     Aug. 29, 2019

Related U.S. Application Data

(60) Provisional application No. 62/635,264, filed on Feb. 26, 2018.

(51) Int. Cl.
*A23L 3/40* (2006.01)
*A23L 3/00* (2006.01)
*F26B 9/06* (2006.01)

(52) U.S. Cl.
CPC ................ *A23L 3/40* (2013.01); *A23L 3/001* (2013.01); *F26B 9/066* (2013.01); *A23V 2002/00* (2013.01)

(58) Field of Classification Search
CPC .... F26B 9/00; F26B 9/06; F26B 21/00; F26B 21/06; A23L 3/001; A23L 3/40; A23V 2002/00

(Continued)

(56) References Cited

U.S. PATENT DOCUMENTS 5,235,906 A * 8/1993 Hsu .................. F26B 9/003
126/21 A
5,311,673 A * 5/1994 Su .................... F26B 9/003
34/197

(Continued)

FOREIGN PATENT DOCUMENTS

DE      2806989 A1 * 1/1979  .............. F26B 9/066
GB      1597879 A  * 9/1981  .............. G08G 1/095

(Continued)

OTHER PUBLICATIONS

International Search Report dated Jun. 5, 2019 for corresponding PCT/US2019/019506.

(Continued)

*Primary Examiner* — Stephen M Gravini
(74) *Attorney, Agent, or Firm* — Bachman & LaPointe, P.C.

(57) ABSTRACT

The dehydrator minimizes energy use by using a dual-inlet heater fan in cooperation with first and second temperature sensors to measure temperature of the recycled air flowing within the enclosure, while both the ambient and recycled air flow through separate first and second inlets into the fan. Depending upon temperature differences, a controller can change fan heat output and air flow rates through the fan. The dehydrator minimizes space by having a collapsible enclosure embodiment that utilizes folding walls secured to pivoting front and back walls to form both a collapsed configuration and also a fully assembled configuration.

18 Claims, 20 Drawing Sheets

(58) Field of Classification Search
USPC .......................................................... 34/554
See application file for complete search history.

(56) References Cited

U.S. PATENT DOCUMENTS

| | | | | |
|---|---|---|---|---|
| 5,379,527 | A * | 1/1995 | Su ..................... | A23B 7/0205 |
| | | | | 219/400 |
| 5,437,108 | A * | 8/1995 | Alseth ................ | A23L 3/40 |
| | | | | 34/196 |
| 5,878,508 | A * | 3/1999 | Knoll .................. | A01J 11/04 |
| | | | | 34/197 |
| 6,085,442 | A * | 7/2000 | Erickson ............. | A01J 13/00 |
| | | | | 34/381 |
| 6,892,476 | B2 | 5/2005 | Forget et al. | |
| 7,934,494 | B1 | 5/2011 | Schneider | |
| 8,835,810 | B2 * | 9/2014 | Moon .................. | A21B 1/22 |
| | | | | 219/386 |
| D744,273 | S * | 12/2015 | Barrows ............. | D7/323 |
| 9,468,340 | B2 * | 10/2016 | So ....................... | A47J 43/24 |
| 9,615,604 | B2 * | 4/2017 | Russick .............. | A23N 17/004 |
| 9,801,406 | B2 * | 10/2017 | Pan .................... | A23L 3/40 |
| 9,877,502 | B2 * | 1/2018 | Ha ..................... | A23L 3/40 |
| 10,337,794 | B2 * | 7/2019 | Barrows ............ | A23B 4/031 |
| 10,362,795 | B2 * | 7/2019 | Backus ............... | F26B 3/04 |
| 2009/0025248 | A1 * | 1/2009 | Lannon .............. | F26B 25/18 |
| | | | | 34/196 |
| 2014/0182158 | A1 * | 7/2014 | Ghosh ................ | F24S 23/77 |
| | | | | 34/93 |
| 2015/0068886 | A1 * | 3/2015 | Domen ............... | B01D 5/0015 |
| | | | | 203/2 |
| 2018/0231308 | A1 * | 8/2018 | Ileleji ................ | F26B 3/28 |
| 2019/0059421 | A1 * | 2/2019 | Butler ................ | F26B 21/14 |
| 2019/0261656 | A1 * | 8/2019 | Taylor ................ | F26B 21/02 |
| 2019/0337715 | A1 * | 11/2019 | Ramandev ......... | F26B 21/08 |

FOREIGN PATENT DOCUMENTS

| | | |
|---|---|---|
| KR | 101608707 B1 | 4/2016 |
| KR | 20170059752 A | 5/2017 |

OTHER PUBLICATIONS

Written Opinion of International Search Authority for corresponding PCT/US2019/019506.

* cited by examiner

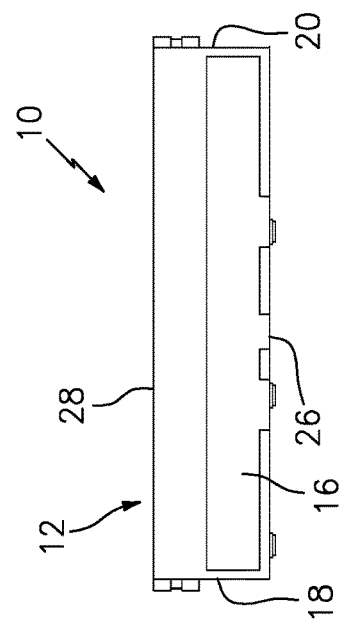
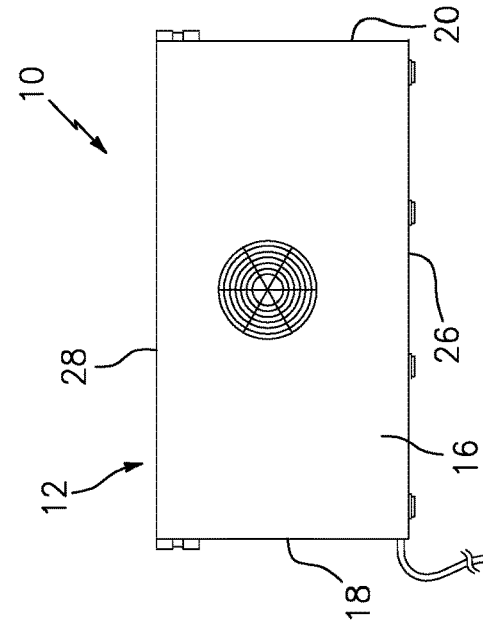
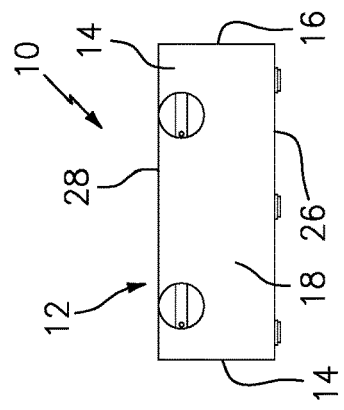
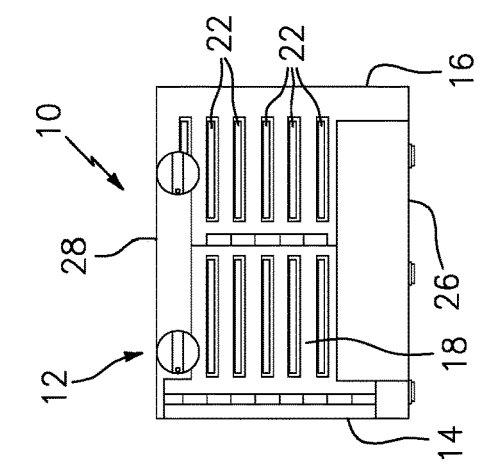
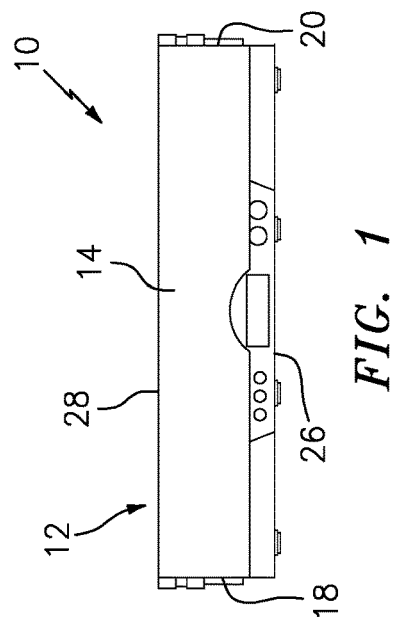
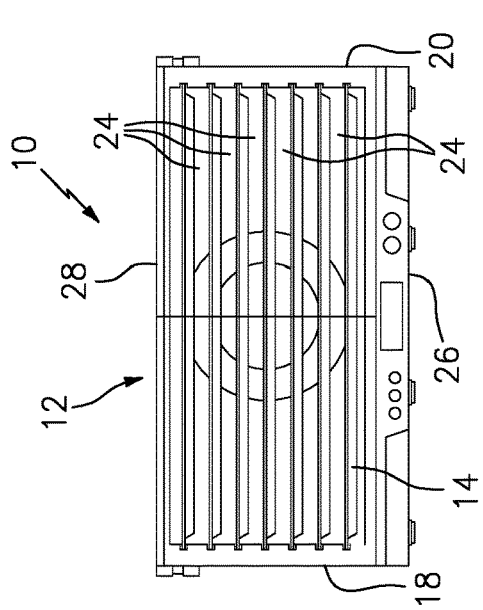

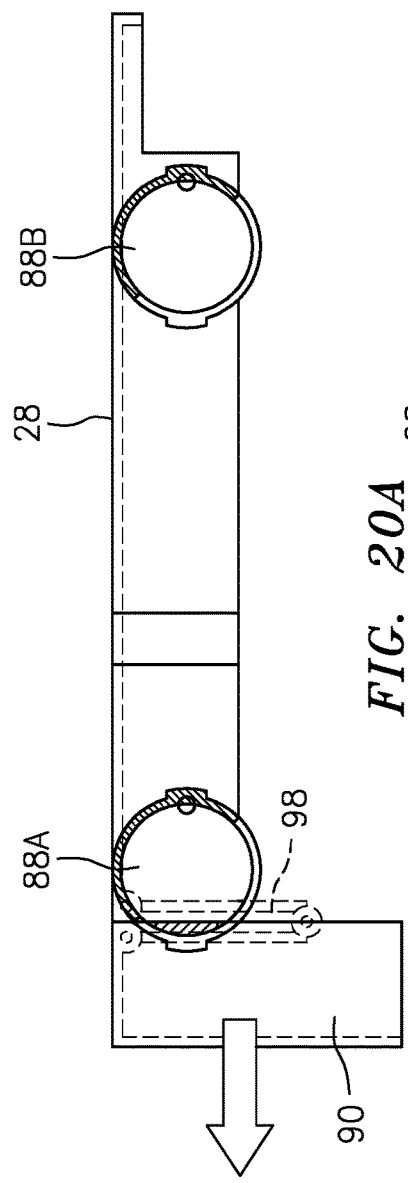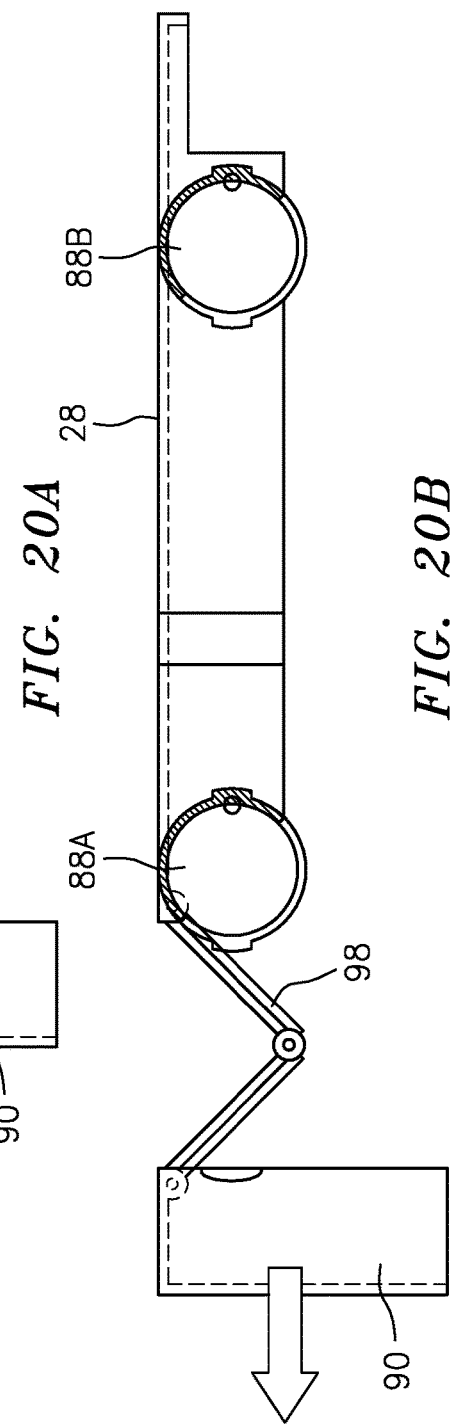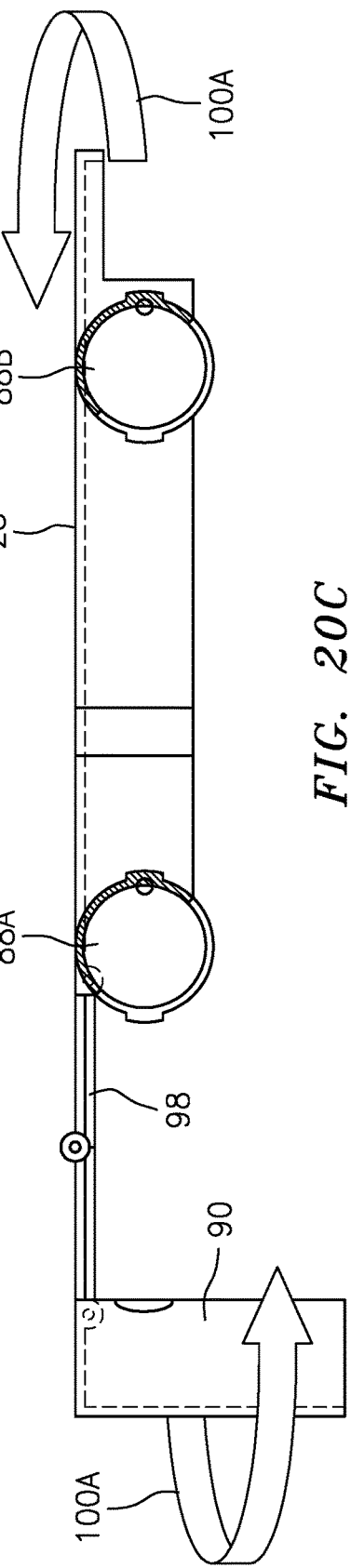

ENERGY AND SPACE SAVING DEHYDRATOR

CROSS-REFERENCE TO RELATED APPLICATION

This application claims the benefit of provisional application Ser. No. 62/635,264, filed Feb. 26, 2018.

BACKGROUND

The present disclosure is directed to dehydrators, and in particular to an energy and space saving dehydrator.

Dehydration is one of the oldest food preservation techniques. Exposing fresh, moist food to a low humidity environment enhances evaporation of water from the surface of the food. Moisture in the interior of the food diffuses to the surface and subsequently evaporates. The moisture content of the food decreases to a steady-state level determined by the moisture content of the surrounding air.

A common technique for food dehydration is to create a low humidity environment by heating air inside an enclosure. As the temperature of the air increases the relative humidity of the air decreases so that more moisture may be may be absorbed by the air. Air is typically heated by using a fan to blow air across a resistively heated wire. A certain level of air exchange in and out of the enclosure is required to ensure that evaporated water from the moist food is exhausted and fresh air is brought in, thus ensuring that the humidity inside the enclosure stays low.

Dehydrators are typically sized so that large quantities of food can be dried efficiently. Drying times may be as long as 6-24 hours. Food is cut or formed into thin pieces and is placed in single layers on drying trays stacked within the enclosure.

As a result, the volume of the enclosure is typically quite large. Since dehydrators are typically used on a seasonal or intermittent basis, a common complaint is the difficulty to store such a large appliance when not in use. Also, the fans used to create heated airflow within the enclosure are often noisy. Additionally, known dehydrators typically have resistance heaters that run at one temperature while the fan is operating. This limits opportunities to minimize heat energy use, and to eliminate loss of heat energy if a door or other entryway into the enclosure is inadvertently left open.

Therefore, there is a need for a space saving and energy saving dehydrator that may be easily used to minimize energy use and that may be efficiently stored when not in use.

SUMMARY

In accordance with the present disclosure, there is provided an energy and space saving dehydrator for dehydrating food. The dehydrator includes an enclosure having a front wall and an opposed back wall, a first side wall extending between first exterior side edges of the front and back walls and a second side wall extending between second exterior side edges of the front and back walls. The first and second side walls include a plurality of opposed horizontal ridges configured to support a corresponding plurality of trays extending between and upon the opposed horizontal ridges for supporting food to be dehydrated on the trays. A base extends between bottom edges of the front, back and side walls. A cover extends between top edges of the front, back and side walls to define the enclosure between the base the walls and the cover to enclose the trays. At least one of the base, the walls and the cover define one or more exit slits for permitting passage of heated air out of the enclosure.

A dual-inlet heater fan is secured to either one of the side walls, the back wall or the cover. The dual-inlet heater fan includes a first fan inlet that is positioned adjacent an enclosure opening defined within one of the walls and the cover of the enclosure. The first fan inlet is configured for drawing and heating ambient air from outside the enclosure into the enclosure. The dual-inlet heater fan also includes a second fan inlet positioned within the enclosure for recycling and heating air within the enclosure through the fan heater. A first temperature sensor is secured within the enclosure and is positioned adjacent an outlet of the dual-inlet fan heater for sensing a temperature of heated air passing out of the dual-inlet fan heater. A second temperature sensor is secured adjacent the second fan inlet for sensing a temperature of recycled air passing into the second fan inlet of the dual-inlet fan heater.

A controller is secured in communication with the first temperature sensor and with the second temperature sensor. The controller is configured to limit a predetermined maximum temperature of the heated air sensed by the first temperature sensor. The controller is configured to operate the heater based on a predetermined set point temperature of the recycled air sensed by the second temperature sensor. The controller is also configured so that whenever the temperature of the recycled air sensed by the second temperature sensor is less than the predetermined set point, the controller controls the heater of the dual-inlet heater fan to be in an on position producing heat.

In another and alternative embodiment, the energy and space saving dehydrator includes a variable sized opening adjacent the first fan inlet. The variable sized opening is secured in communication with the controller for varying the size of the opening and thereby varying the amount of ambient air passing through the first fan inlet.

In another and alternative embodiment, the dual-inlet heater fan is secured in communication with the controller. The controller is configured to increase and decrease a flow rate of the recycled and ambient air flowing through the dual-inlet heater fan.

In another and alternative embodiment, the the dual-inlet heater fan includes a plurality of rotatable, air moving fins that are curved backwards in a direction opposed to a direction the fins move air while rotating, to thereby decrease noise generated by the rotating fins.

In another and alternative embodiment, the plurality of rotatable, air-moving fins are arranged in a flat circle about a rotational axis of the fins. Additionally, the fins define a fan central throughbore at the center of the circle and rotational axis of the fins so that a core of an electric motor that rotates the fins can be secured within the fan central throughbore. This structure decreases a length of the dual-inlet heater fan, wherein the fan length is parallel to the rotational axis of the rotating fins.

In another and alternative embodiment of the energy and space saving dehydrator, the dual-inlet heater fan includes a mounting plate secured to a suction side of the dual-inlet heater fan. The mounting plate also defines a mounting-plate throughbore that is dimensioned to surround the enclosure opening while the mounting plate secures the dual-inlet heater fan to one of the walls and cover of the enclosure. This permits the ambient air to pass through the mounting-plate throughbore into contact with the rotating fins of the dual-inlet heater fan. The dual-inlet heater fan also includes a deflection plate secured in parallel disposition to the mounting plate and to an opposed side of the rotating fins.

The deflection plate thereby deflects incoming ambient air to pass out of the fan in a direction parallel to and away from the plates. The deflection plate also defines a deflection-plate throughbore dimensioned to overlie a rotational axis of the rotating fins and to permit inflow of recycled, heated air within the enclosure through the deflection-plate throughbore and into contact with the rotating fins. In this embodiment, the heater of the dual-inlet heater fan is an electric resistance heater element secured between the mounting plate and the deflection plate and is positioned to be spaced apart from and at least partially surrounding the rotating fins. The resistance heater element may be in the form of a coiled wire. In another embodiment, there can be multiple heater elements.

In another and alternative embodiment of the energy and space saving dehydrator, at least one pivot spacer is secured adjacent an exterior surface of the back wall. The pivot spacer is configured to pivot from a flush mounting within the back wall to a spacer mounting wherein the pivot spacer extends in a direction away from the back wall and away from the enclosure to thereby prevent the enclosure from being positioned adjacent an ambient air blocking wall.

In another and alternative embodiment the energy and space saving dehydrator the enclosure is a collapsible enclosure. In this embodiment, the dual-inlet heater fan is secured to the back wall adjacent the enclosure opening which is also defined within the back wall. Whenever the collapsible enclosure is in a collapsed configuration, the first and second side walls are folding walls, the front wall is pivotally secured to the folding side walls, and the back wall is pivotally secured to the base so that the side walls, front wall and back wall form a collapsible middle member that is configured to be folded and pivoted to collapse to overlie and be adjacent to the base. Additionally, the cover is detachably secured to overlie the downwardly pivoted back wall. Whenever the collapsible enclosure is in an assembled configuration, the back wall is pivoted away from the base, the folded side walls are also pivoted away from the base with the back wall and are unfolded away from the back wall, and the front wall is pivoted away from the unfolded side walls, so that the collapsible middle member is uncollapsed to form a box-like shape. The cover is detachably secured to top edges of the collapsible middle member to form the assembled configuration of the enclosure.

In another and alternative embodiment of the collapsible enclosure embodiment of the energy and space saving dehydrator, the base includes a well dimensioned to receive and hold the plurality of trays whenever the collapsible dehydrator is in the collapsed configuration. Additionally, the trays may be in the form of stainless steel screens In another and alternative embodiment of the collapsible enclosure embodiment of the energy and space saving dehydrator, the front wall is one of either a single glass piece secured by a hinge to a front edge of a side wall, or double glass pieces hinged to front edges of the opposed side walls. Additionally, the single glass piece and the double glass pieces include a latch for releasably securing the single glass piece or the double glass pieces to front edges of the base and/or the cover.

In another and alternative embodiment of the collapsible enclosure embodiment of the energy and space saving dehydrator, the cover includes a rotary latch rotationally secured to each of four corners of the cover. Each rotary latch is configured to rotate to secure the cover to latch tabs at corresponding corners of the base whenever the collapsible enclosure is in a collapsed configuration. Additionally, each rotary latch is also configured to rotate to secure the cover to upper latch tabs at corresponding corners of the side walls whenever the collapsible enclosure is in an assembled configuration.

In another and alternative embodiment of the collapsible enclosure embodiment of the energy and space saving dehydrator, the cover includes an extendable shelf and a securing strut extending perpendicular to the shelf and toward the base. The extendable shelf is configured to be secured in a non-extended position by the rotary latches that are secured to the front corners of the cover. The securing strut extends from the extendable shelf to rest upon a protruding shelf of the base whenever the collapsible enclosure is in a collapsed configuration. The rotary latches are configured to rotate to release the extendable shelf so that it may be released and extended whenever the collapsible enclosure is in an assembled configuration. The cover is also configured to be rotated one-hundred and eighty degrees whenever the shelf is extended and so that the securing strut may be secured within a receiving slot defined within the back wall of the dehydrator enclosure to secure the cover over the front, side and back walls Other details of the energy and space saving dehydrator are set forth in the following detailed description and the accompanying drawings wherein like reference numerals depict like elements.

BRIEF DESCRIPTION OF THE DRAWINGS

FIG. 1 is a front view of a front wall of an energy and space saving dehydrator showing an enclosure of the dehydrator in a collapsed configuration.

FIG. 2 is a side view of the FIG. 1 energy and space saving dehydrator showing the enclosure of the dehydrator in a collapsed configuration.

FIG. 3 is a back view of the FIG. 1 energy and space saving dehydrator showing the enclosure of the dehydrator in a collapsed configuration.

FIG. 4 is a front view of the FIG. 1 energy and space saving dehydrator showing the enclosure of the dehydrator in an assembled configuration.

FIG. 5 is a side view of the FIG. 1 energy and space saving dehydrator showing the enclosure of the dehydrator in an assembled configuration.

FIG. 6 is a back view of the FIG. 1 energy and space saving dehydrator showing the enclosure of the dehydrator in an assembled configuration.

FIG. 20A is a side schematic view of the cover of the dehydrator and showing an extendable shelf folded adjacent a front edge of the cover, showing a securing strut adjacent the extendable shelf, and showing a rotary latch securing the securing strut adjacent the extendable shelf.

FIG. 20B is a side schematic view of the cover of the dehydrator of FIG. 21A and showing the rotary latch rotated to unsecure the extendable shelf, showing the extendable shelf partially unfolded, and showing the securing strut secured to a leading edge of the extendable shelf.

FIG. 20C is a side schematic view of the cover of the dehydrator of FIG. 21 and showing the extendable shelf fully extended and with 180 degree turn arrows showing how the cover can be re-positioned upon top edges of the front wall, side walls and back wall of the dehydrator.

DETAILED DESCRIPTION

Figure 7:
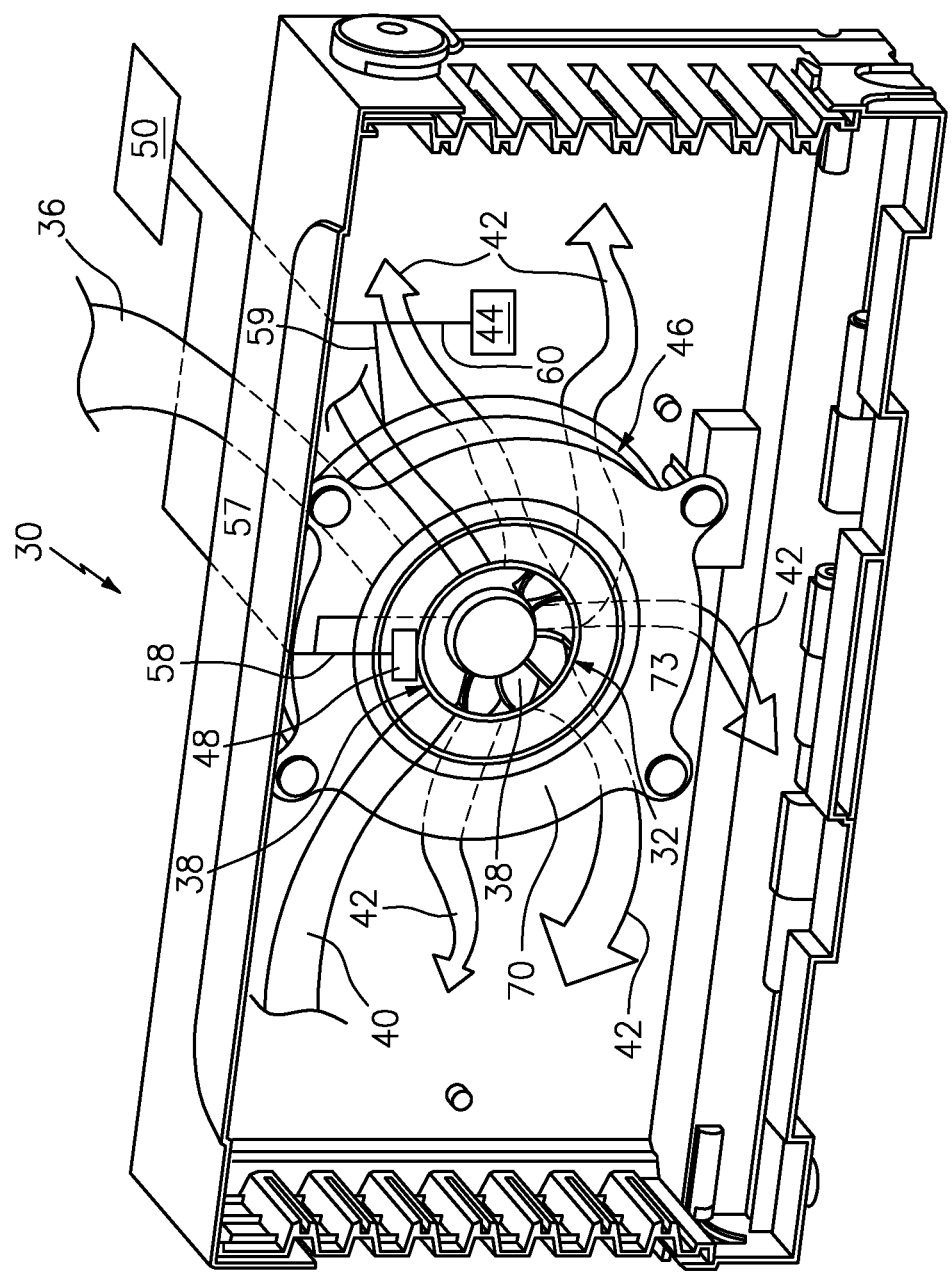
FIG. 7 is a front perspective view of a dual-inlet heater fan of the present invention showing flow of ambient air and flow of recycled air through the fan with flow arrows.

Referring now to the FIGURES and in accordance with the present disclosure, there is illustrated an energy and space saving dehydrator for dehydrating food that is generally designated by the reference numeral 10, as shown in the sequence of FIGS. 1-6. FIGS. 1-6 show the dehydrator going from a collapsed configuration in FIGS. 1-3 to an assembled, non-collapsed configuration in FIGS. 4-6.

In particular, FIG. 1 shows that the dehydrator 10 includes an enclosure 12 having a front wall 14 and an opposed back wall 16, a first side wall 18 extending between first exterior side edges of the front and back walls 14, 16 and a second side wall 20 extending between second exterior side edges of the front 14 and back walls 16. The first and second side walls 18, 20 include a plurality of opposed horizontal ridges 22 (shown in FIG. 5 and shown best in FIG. 17) configured to support a corresponding plurality of trays 24 (shown in FIG. 4) extending between and upon the opposed horizontal ridges 22 for supporting food (not shown) to be dehydrated on the trays 24. A base 26 extends between bottom edges of the front wall 14, the back wall 16, and the side walls 18, 20. A cover 28 extends between top edges of the front, back and side walls 14, 16, 18, 20 to define the enclosure 12 between the base 26, the walls 14, 16, 18, 20 and the cover 28 to enclose the trays 24. At least one of the base 26, the walls 14, 16, 18, 20 and the cover 28 define one or more exit slits 29 (shown in FIG. 24) for permitting passage of heated air out of the enclosure 12.

FIG. 7 shows that a dual-inlet heater fan 30 is secured to either one of the side walls 18, 20, the back wall 16 or the cover 28. The dual-inlet heater fan 30 includes a first fan inlet 32 (shown in FIGS. 13, 17 and 25) that is positioned adjacent an enclosure opening 34 (shown in FIGS. 17 and 18) defined within one of the walls 14, 16, 18, 20 and the cover 28 of the enclosure 12. As shown by the ambient air flow line in FIG. 7, the first fan inlet 32 is configured for drawing and heating ambient air 36 from outside the enclosure 12 into the enclosure 12. The dual-inlet heater fan also includes a second fan inlet 38 positioned within the enclosure 12 for recycling and heating air within the enclosure 12 through the fan heater 30. Recycling air is shown in FIG. 7 by recycling air flow line 40 that is leading into the second fan inlet 38. The dual-inlet fan heater 30 mixes the ambient air flow 36 and recycling air flow 40 within the fan heater 30 and discharges the mixed air, represented by flow arrows 42 leaving the dual-inlet heater fan 30.

FIG. 7 also shows a first temperature sensor 44 is secured within the enclosure 12 and is positioned adjacent an outlet 46 of the dual-inlet fan heater 30 for sensing a temperature of heated air passing 42 out of the dual-inlet fan heater 30. A second temperature sensor 48 is secured adjacent the second fan 38 inlet for sensing a temperature of recycled air 40 passing into the second fan inlet 38 of the dual-inlet fan heater 30.

Figure 9:
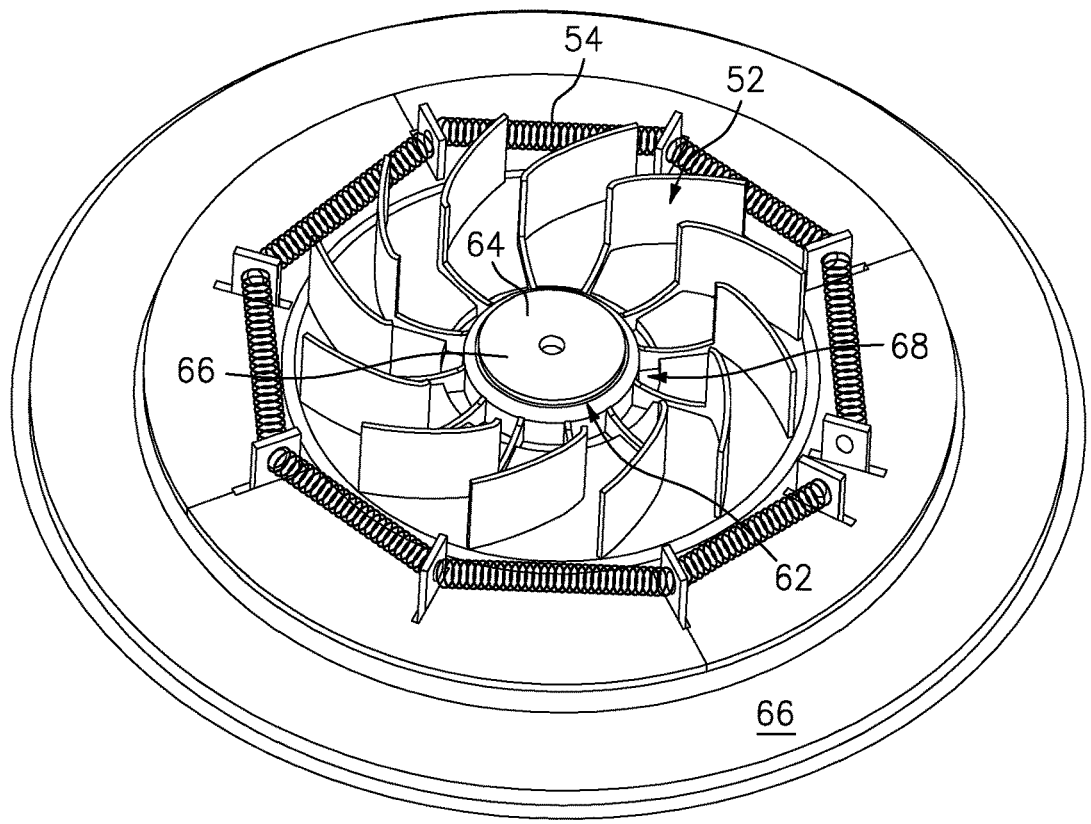
FIG. 9 is a raised perspective view of the FIG. 8 rotating fins defining a fan central throughbore with an electric motor within the fan central throughbore and with a resistance heater surrounding the rotating fins.

A controller 50 is secured in communication with the first temperature sensor 44, with the second temperature sensor 48, with a fan 52 and a heater 54 of the dual-inlet heater 30. (The fan 52 and heater 54 are best shown in FIG. 9). The controller 50 may be any controller 50 that is capable of performing functions described herein, including a computer, electro-mechanical switches operative in response to bi-metallic coil and other types of thermostats, mechanical or toggle type switches manually operated in response to sensed or other temperature sensors, including known thermometers, temperature gauges, etc. In an exemplary embodiment, the controller 50 can be a small logic chip coupled with solid state triacs configured to switch the electrical load on and off. A traic can be switched millions of times, which is advantageous.

As described above in the SUMMARY section, the controller 50 is configured so that whenever a temperature of the heated air 42 leaving the dual-inlet heater fan 30 and sensed by the first temperature sensor 44, exceeds a predetermined maximum limit and/or a temperature of the recycled air 40 entering the second fan inlet 38 sensed by the second temperature sensor 48 is greater than a predetermined set point, the controller 50 controls the heater 54 of the dual-inlet heater fan 30 to be in an off position producing no heat. Additionally, the controller 50 is configured so that whenever the temperature of the recycled air 40 sensed by the second temperature sensor 48 is less than the predetermined set point, the controller 50 controls the heater 54 of the dual-inlet heater fan 30 to be in an on position producing heat. An exemplary predetermined maximum temperature limit is about thirty degrees Fahrenheit above the predetermined temperature set point. (For purposes herein, the word "about" is to mean plus or minus twenty percent.) The maximum temperature limit is configured to avoid a condition where the heater 54 from running away, that is, overheating, due to conditions with the dehydrator 10, such as having the doors of the enclosure left open or if the dehydrator 10 is operated in an extremely cold ambient environment. The controls configured herein also prevents the interior of the dehydrator 10 from reaching a temperature that is too high when the initial drying is taking place, and water evaporating from the food has its greatest effect on the air conditions.

Figure 25:
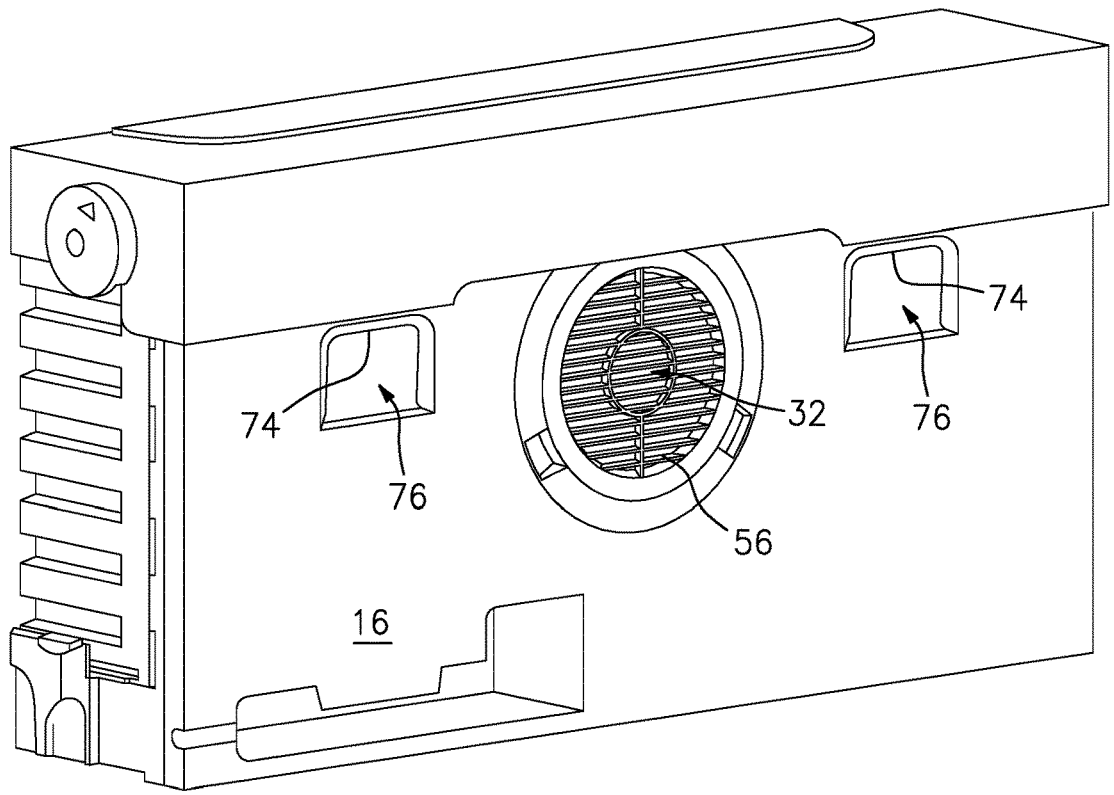
FIG. 25 is a back perspective view of a back wall of the energy and space saving dehydrator and showing louvers to vary a flow rate of ambient air into the dual-inlet heater fan, and showing pivot spacers pivoted within spacer slots defined within the back wall.

FIG. 25 shows that in another and alternative embodiment, the energy and space saving dehydrator 10 includes a variable sized opening 56 adjacent the first fan inlet 32. The variable sized 56 opening may be secured in communication with the controller 50 so that the controller 50 may vary the size of the opening and thereby vary the amount of ambient air 40 passing through the first fan inlet 32. The variable sized opening may be an assembly of louvres, like a "venetian blind" apparatus, or any other structure that achieves the function of varying a flow rate of the ambient air 40, such as electro-mechanical valves, manually operated valves, etc.

As shown schematically in FIG. 7, the dual-inlet heater fan 30 may be secured in electrical communication with the controller through line 57 to the fan 52, through line 58 to the second temperature sensor 48, through line 59 to the heater 54, and through line 60 to the first temperature sensor 44. The controller 50 is configured to selectively increase and decrease a flow rate and a temperature of the recycled air 40 and the ambient air 36 flowing through the dual-inlet heater fan 30.

Figure 8:
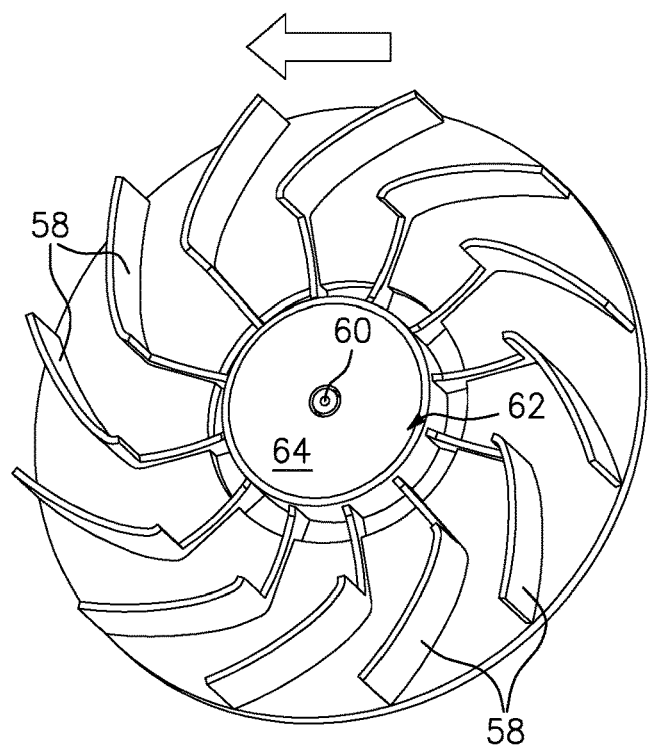
FIG. 8 is front perspective view of rotating fins of a fan of the dual-inlet heater fan.

FIG. 8 shows that in another and alternative embodiment of the dehydrator 10, the fan 52 of dual-inlet heater fan 30 includes a plurality of rotatable, air moving fins 58 that are curved backwards in a direction opposed to a direction the fins 30 move air while rotating, to thereby decrease noise generated by the rotating fins 30. Directional arrow 60 in FIG. 8 shows the direction the fins 30 move the air.

FIGS. 8 and 9 also show that in another and alternative embodiment of the dehydrator 10, the plurality of rotatable, air-moving fins 58 are arranged in a flat circle about a rotational axis 60 of the fins 58. Additionally, the fins 58 define a fan central throughbore 62 at the center of the circle and rotational axis 60 of the fins 58 so that a core 64 of an electric motor 66 that rotates the fins 58 can be secured within the fan central throughbore 62. This structure decreases a length of the dual-inlet heater fan 30, wherein the fan length is parallel to the rotational axis 60 of the rotating fins 58.

FIG. 9 shows that in another and alternative embodiment of the energy and space saving dehydrator 10, the dual-inlet heater fan 30 includes a mounting plate 66 secured to a suction side of the dual-inlet heater fan 30. The mounting plate 66 also defines a mounting-plate throughbore 68 that is dimensioned to surround the enclosure opening 34 (shown in FIG. 17) while the mounting plate 66 secures the dual-inlet heater fan 30 to one of the walls 14, 16, 18 and cover 28 of the enclosure 12. This permits the ambient air 36 to pass through the mounting-plate throughbore 68 into contact with the rotating fins 58 of the dual-inlet heater fan 30. The dual-inlet heater fan also includes a deflection plate 70 (shown only in FIG. 7) secured in parallel disposition to the mounting plate 66 and to an opposed side of the rotating fins 58. The deflection plate 70 thereby deflects incoming ambient air 36 to pass out of the fan 52 in a direction parallel to and away from the plates 66, 70. The deflection plate 70 also defines a deflection-plate throughbore 72 dimensioned to overlie the rotational axis 60 and the fan central throughbore 62 of the rotating fins 58 and to permit inflow of recycled, heated air 40 within the enclosure 12 through the deflection-plate throughbore 72 and into contact with the rotating fins 58. In this embodiment, the heater 54 of the dual-inlet heater fan 30 is an electric resistance heater element 54 secured between the mounting plate 66 and the deflection plate 70 and is positioned to be spaced apart from and at least partially surrounding the rotating fins 58, as shown in FIG. 9, which FIG. 9 does not include the deflection plate 70. The resistance heater element 54 may be in the form of a coiled wire(s) 54 shown in FIG. 9.

Figure 27:
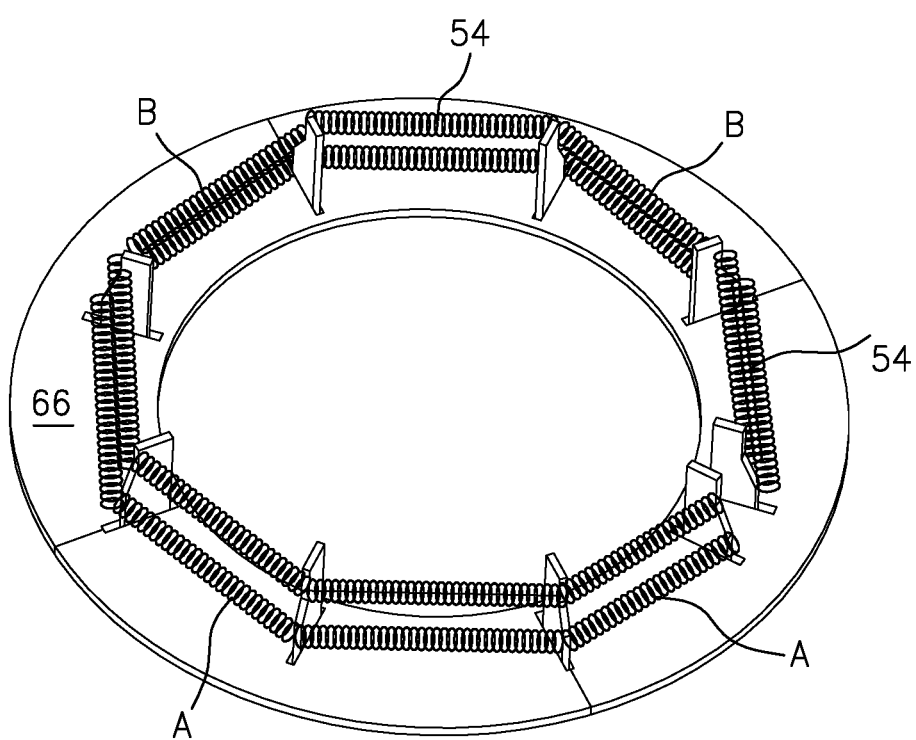
FIG. 27 is an illustration of an alternative embodiment of the heaters.

Referring to FIG. 27 an exemplary embodiment includes two coiled resistance heater elements A and B. The two coiled resistance heater elements A and B can be part of a dual heater configuration to optimize performance and energy savings. Two circuits can be configured in parallel with annular loops of coiled heating wire 54 and surround the fan (FIG. 9). The wattage of each circuit will be optimized both for independent operation and for total power. Circuit A and B can be configured with independent controls for logic and power switching. Dual power circuit can provide advantages. A first advantage can be to reduce the heating load on a triac used for switching power. The heat generated by the triac scales as the square of the current. To minimize triac temperature it is desirable to divide the current between the two circuits, each carrying half the current. The total heat load is therefore reduced by a factor of 2. The other advantage can be to match heating power to heat load. One can utilize the energy saving system, wherein the fresh intake air is varied relative to the remaining moisture content of the food. It is desirable to match the heating power to the heat load and airflow. When maximum intake air is used, both circuits A, B will be on at full power. When the moisture content of the food decreases, the energy absorbed due to latent heat of evaporation also decreases. Simultaneously, intake airflow is reduced as there is less water vapor to flush from the system. It is preferred to operate a single heating circuit at a longer duty cycle, rather than heat at full power with a short duty cycle. If the heating power is much higher than the heat required to maintain temperature, there will be much more temperature overshoot and maintaining stable and accurate temperature is much more difficult.

Figure 26:
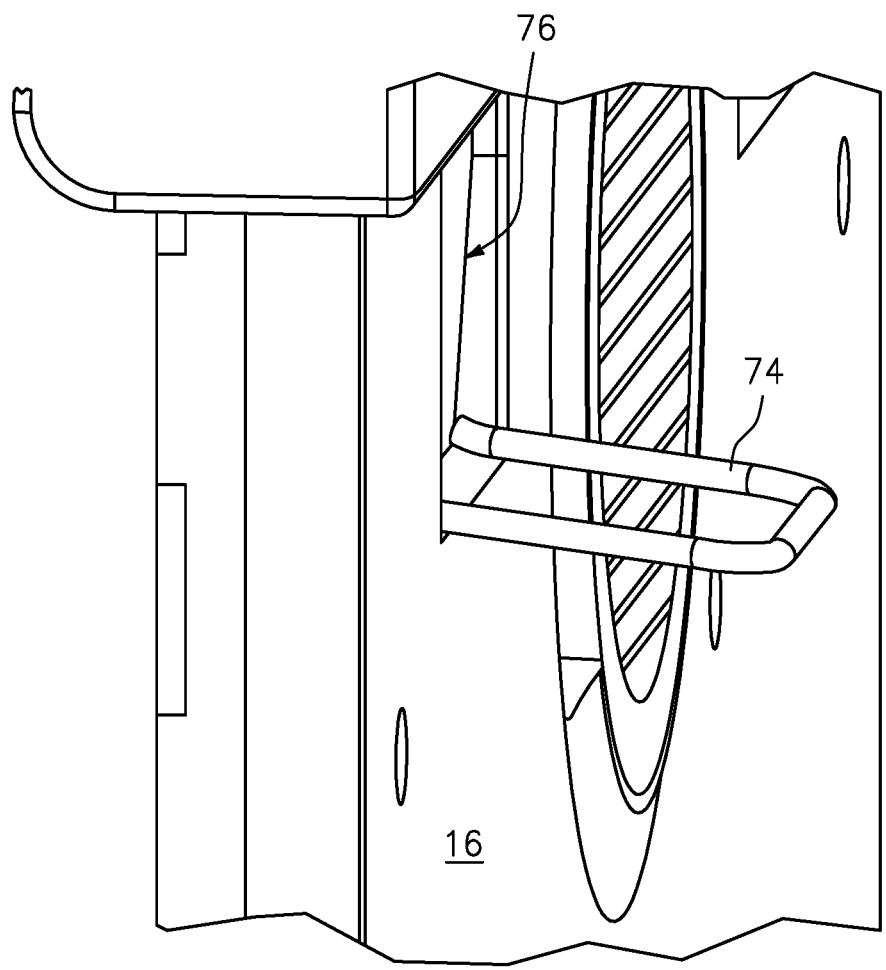
FIG. 26 is a fragmentary perspective view of a back wall of and energy and space saving dehydrator of the present invention and showing a pivot spacer pivoted away from within a pivot slot defined within a back wall of the dehydrator.

FIGS. 25 and 26 show another and alternative embodiment of the energy and space saving dehydrator 10, wherein at least one pivot spacer 74 is secured adjacent an exterior surface of the back wall 16. FIG. 25 shows the pivot spacer pivoted within a pivot well 76 defined in the back wall 16. The pivot spacer 74 is configured to pivot from a flush mounting within pivot well 76 in the back wall 16 to a spacer mounting wherein the pivot spacer 74 extends in a direction away from the back wall 16 and away from the enclosure 12 to thereby prevent the enclosure 12 from being positioned adjacent an ambient air blocking wall (not shown).

Figure 15:
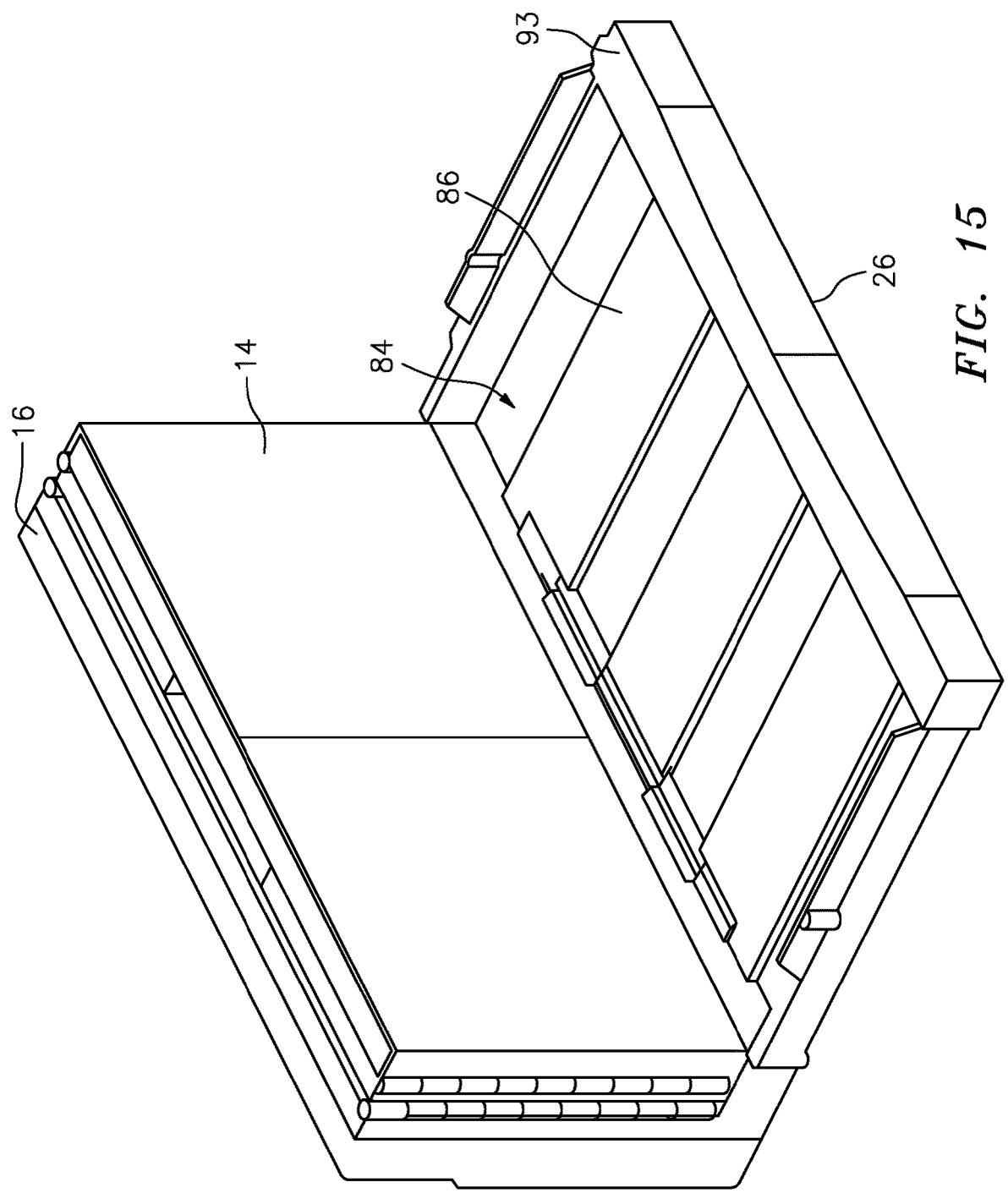
FIG. 15 is a front, raised perspective view of the FIG. 14 dehydrator showing a plurality of trays within a well that is defined within a base of the disclosure.
Figure 16:
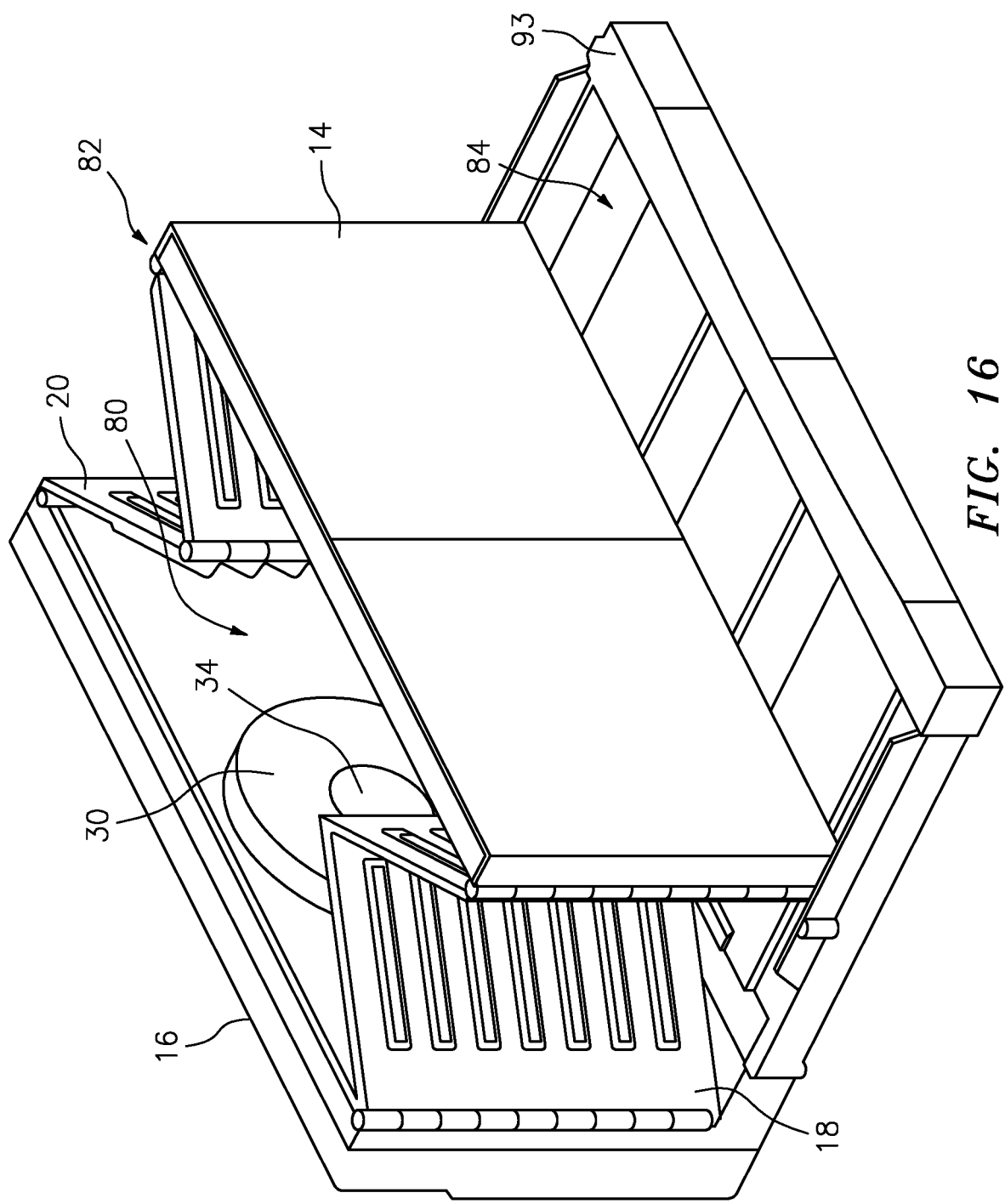
FIG. 16 is a front, raised perspective view of the FIG. 15 dehydrator showing folding side walls extending away from the upright back wall of the dehydrator, and showing an outline of the dual inlet fan in the back wall.

FIGS. 10-23 show that in another and alternative embodiment the energy and space saving dehydrator 10, the enclosure 12 is a collapsible enclosure 80, as shown best in FIG. 16. In this embodiment, the dual-inlet heater fan 30 is secured to the back wall 16 adjacent the enclosure opening 36 which is also defined within the back wall 16. Whenever the collapsible 80 enclosure is in a collapsed configuration, as shown in FIGS. 1-3, and 10, the first and second side walls 18, 20 are folding walls 18, 20, the front wall 14 is pivotally secured to the folding side walls 18, 20, and the back wall 16 is pivotally secured to the base 26 so that the side walls 18, 20, front wall 14 and back wall 16 form a collapsible middle member 82 that is configured to be folded and pivoted to collapse to overlie and be adjacent to the base 26. Additionally, the cover 28 is detachably secured to overlie the downwardly pivoted back wall 16. Whenever the collapsible enclosure 80 is in an assembled configuration (as shown best in FIGS. 1-3 and 22-24 the back wall 16 is pivoted away from the base 26, the folded side walls 18, 20 are also pivoted away from the base 26 with the back wall 16 and are unfolded away from the back wall 16, and the front wall 14 is pivoted away from the unfolded side walls 18, 20, so that the collapsible middle member 82 is uncollapsed to form a box-like shape, as shown best in FIG. 17. The cover 28 is detachably secured to top edges of the collapsible middle member 82 to form the assembled configuration of the collapsible enclosure 80.

As shown in FIG. 15 another and alternative embodiment of the enclosure 12 and the collapsible enclosure 80 embodiment of the energy and space saving dehydrator 10, the base 26 defines a well 84 dimensioned to receive and hold a plurality of trays 86. Additionally, the trays 84 may be in the form of stainless steel screens.

Figure 10:
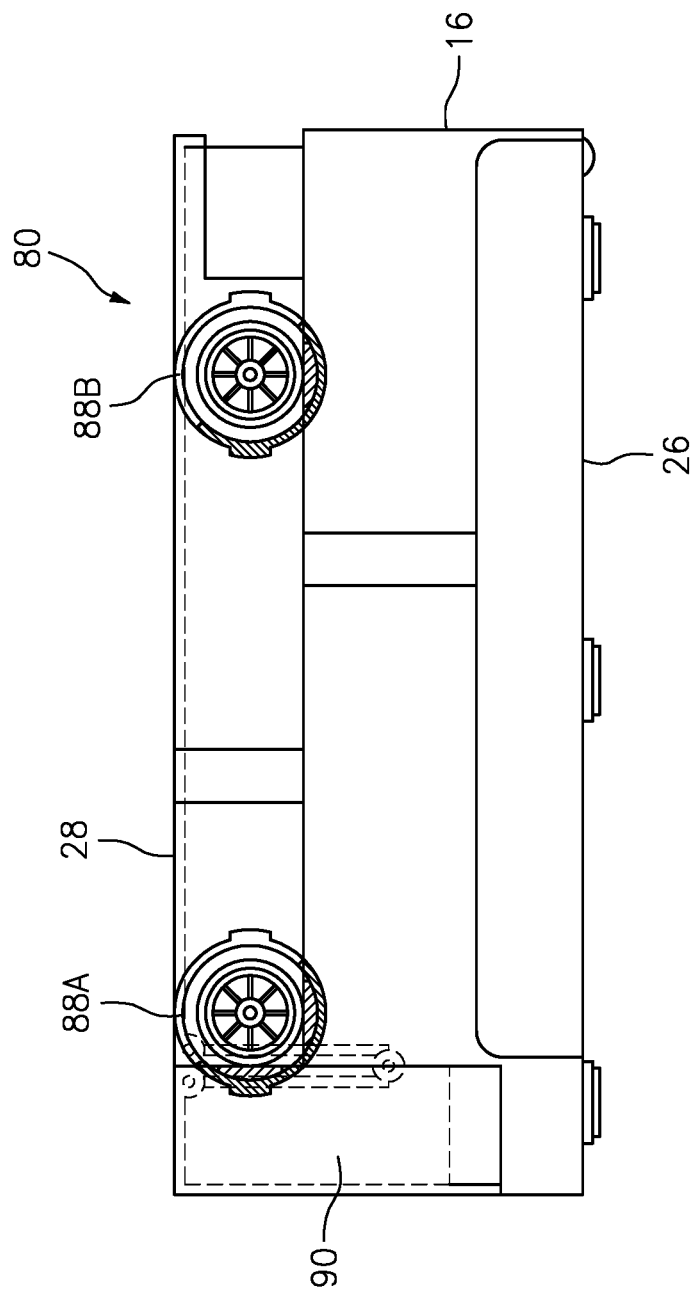
FIG. 10 is a side schematic view of the FIG. 1 energy and space saving dehydrator showing a base, a side wall, a cover having rotary latches at opposed corners of the cover and showing a securing strut extending from a front edge of the cover.
Figure 22:
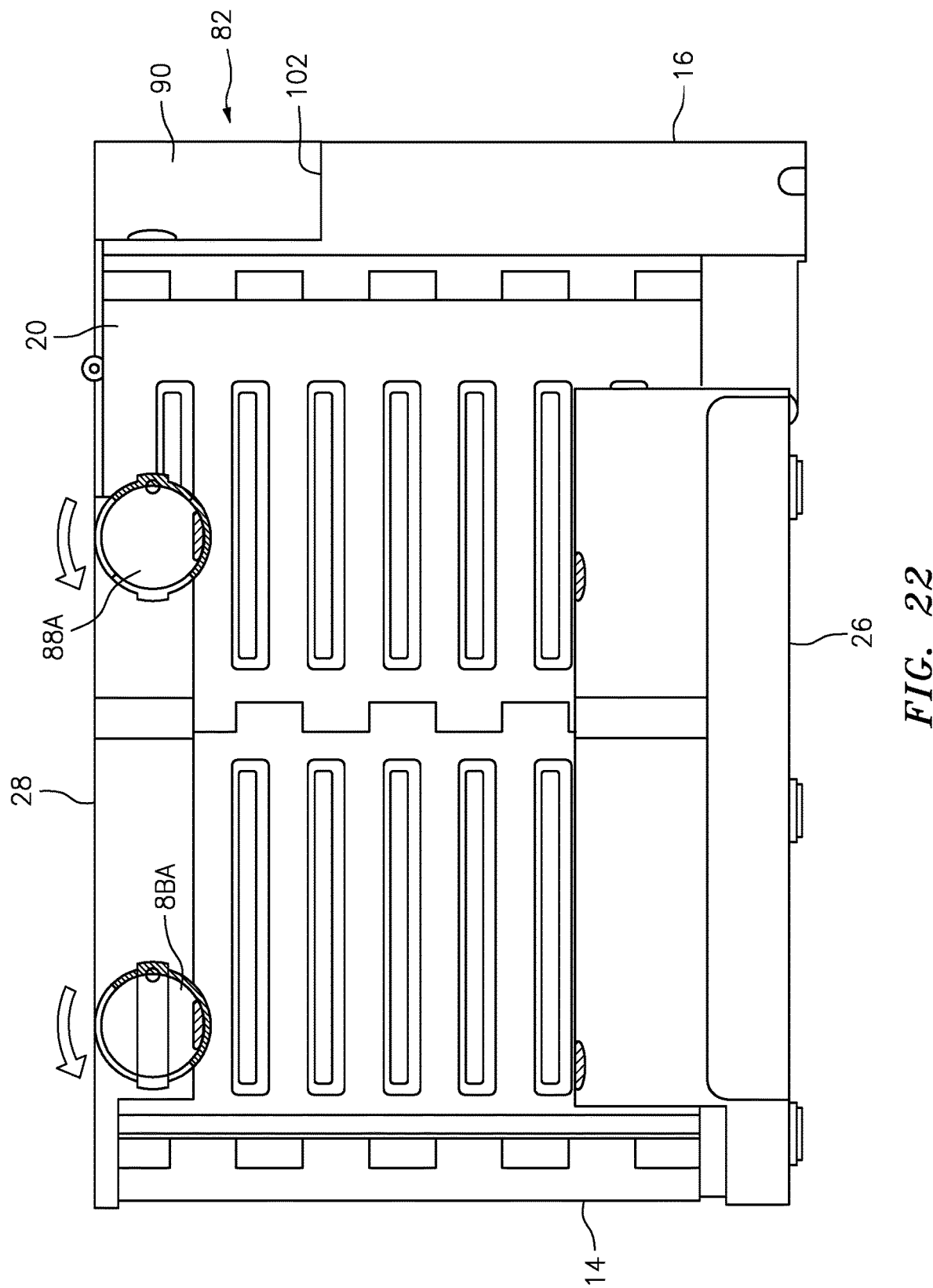
FIG. 22 is a side schematic view of the FIG. 21 view of the enclosure and showing the FIG. 20C cover secure upon the enclosure with the securing strut of the cover within the securing slot defined in the back wall of the enclosure.
Figure 23:
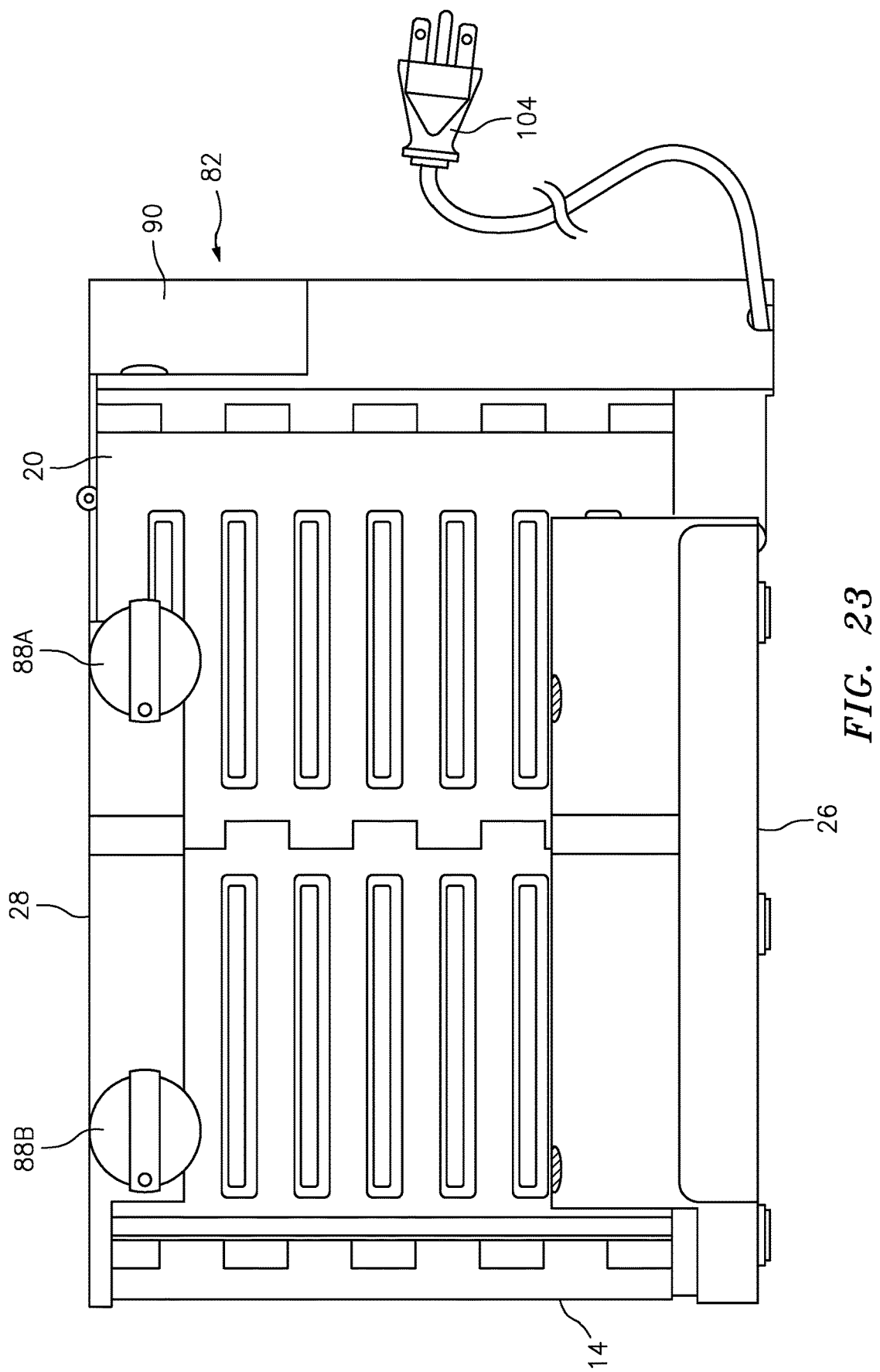
FIG. 23 is a side schematic view of the FIG. 22 dehydrator showing the dehydrator in a fully assembled configuration.

FIGS. 10-23 show conversion of the collapsible enclosure 80 embodiment of the dehydrator 10 from a collapsed configuration of FIG. 10 to an assembled configuration of FIG. 23. These FIGURES will be described next in sequence.

FIG. 10 shows the collapsed configuration of the enclosure 80 and shows the base 26, the first side wall 18, and the cover 26. FIG. 10 also shows rotary latches 88A, 88B at opposed corners of the cover 28 and showing a securing strut 90 extending from a front edge of the cover 28.

Figure 11:
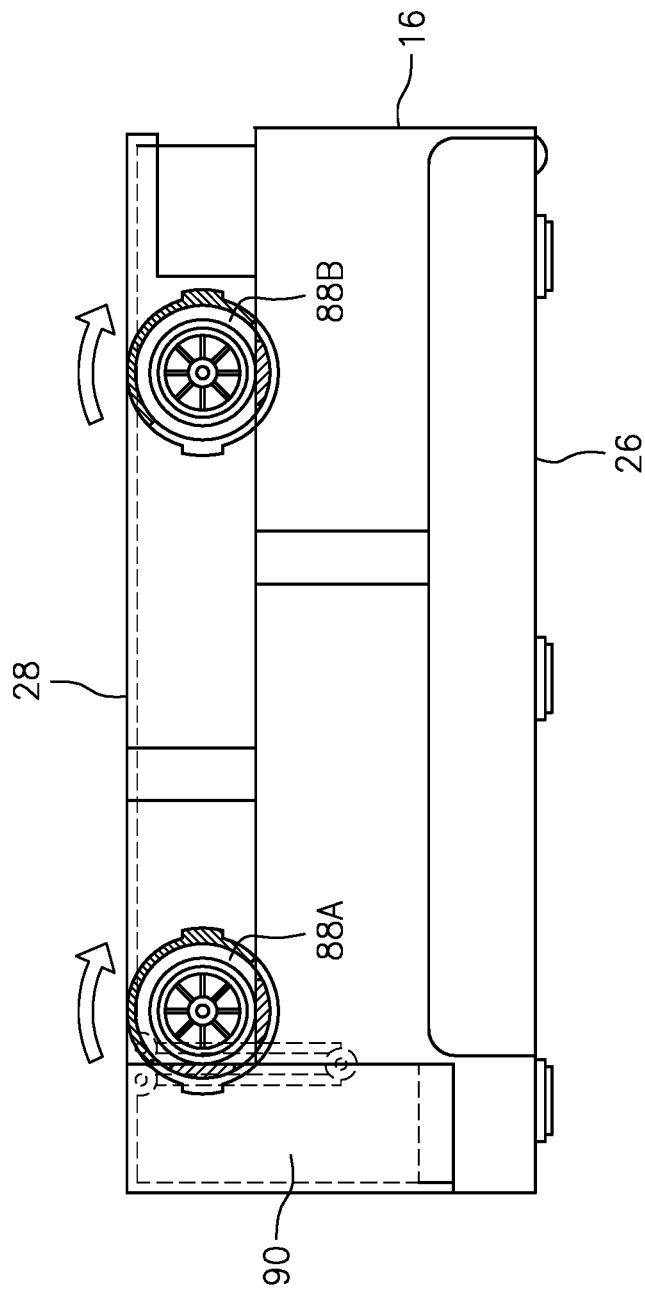
FIG. 11 is a side schematic view of the FIG. 10 dehydrator and showing rotation of the rotary latches as a first step in converting an enclosure of the dehydrator from a collapsed configuration to an assembled configuration.

FIG. 11 shows rotation of the rotary latches 88A, 88B as a first step in converting the collapsible enclosure 80 of the dehydrator from a collapsed configuration to an assembled configuration.

Figure 12:
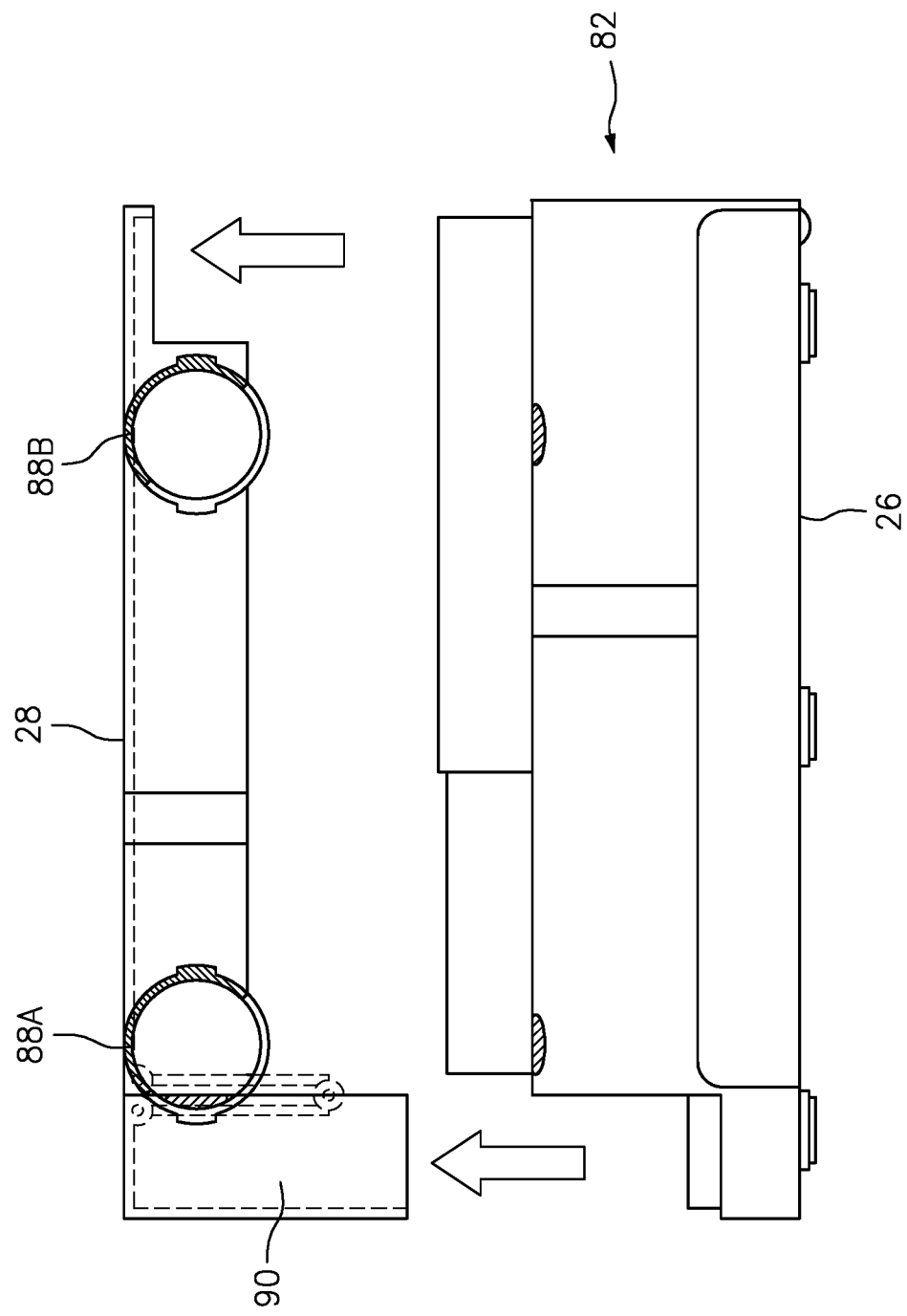
FIG. 12 is a side schematic view of the FIG. 11 dehydrator showing the cover released from the base of the dehydrator.

FIG. 12 shows the cover 28 released from the base of the dehydrator.

Figure 13:
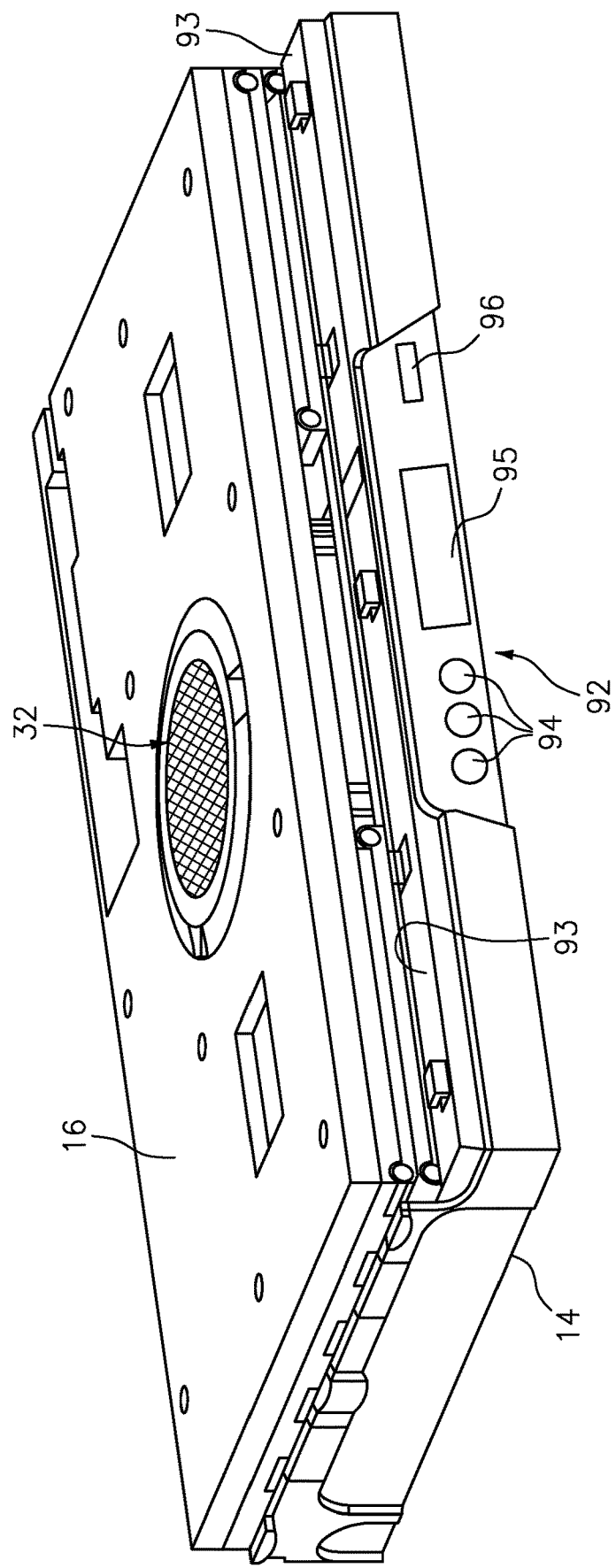
FIG. 13 is a raised perspective view of the present dehydrator showing the dehydrator with the cover removed and in the collapsed configuration.

FIG. 13 shows the collapsible enclosure 80 embodiment of the dehydrator 10 with the cover 28 removed and in the collapsed configuration. FIG. 13 also shows a control panel 92 secured to and within a shelf 93 of the base 14. The control panel 92 is secured in communication with the controller 50, and includes control switches 94, read outs 95 and at least one variable setting rotational regulator 96 mounted to be virtually flush with the control panel 92 and to rotate in a direction parallel to a plane defined by the control panel 92 to avoid having the rotational regulator 96 being damaged.

Figure 14:
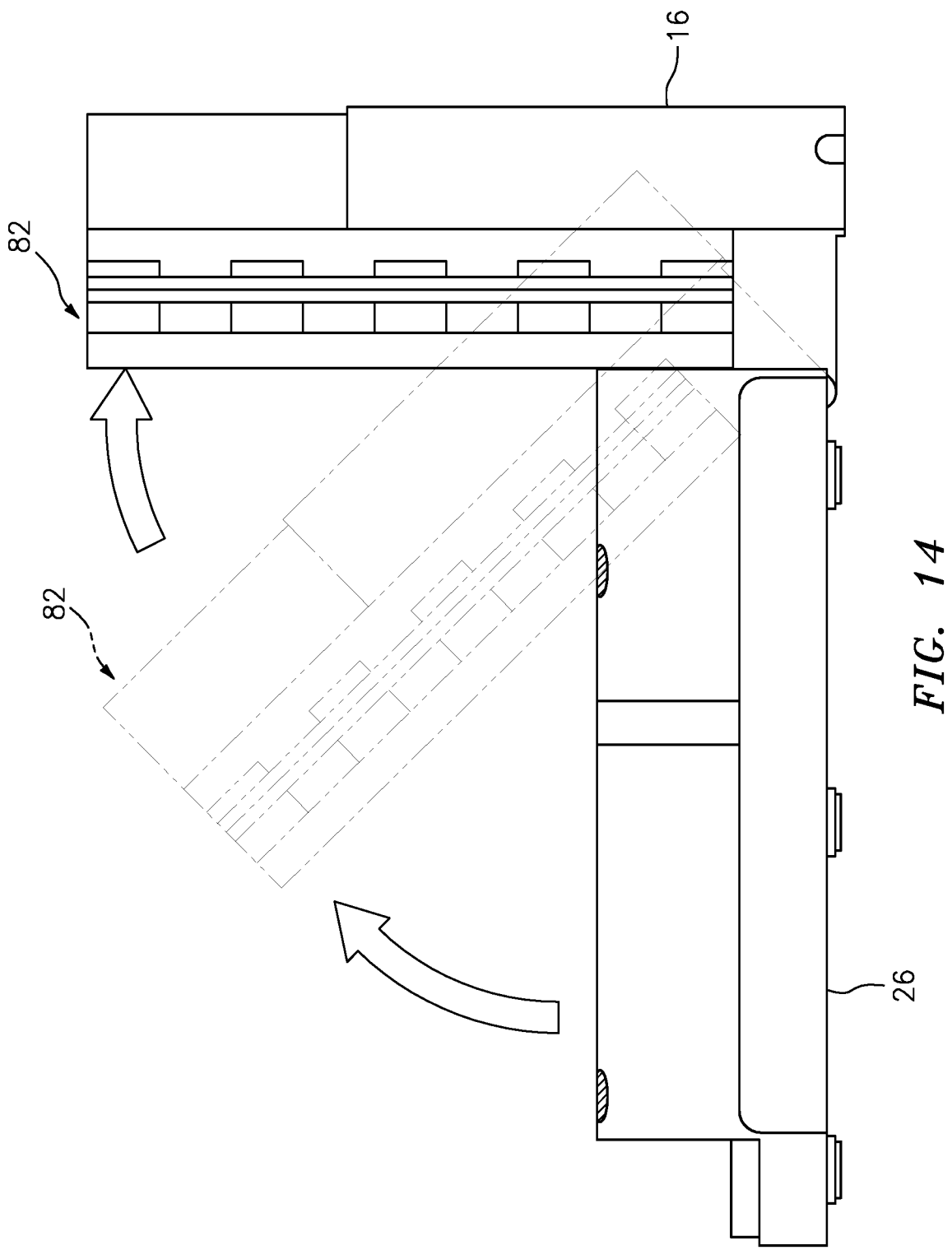
FIG. 14 is a side schematic view of the FIG. 12 dehydrator showing a back wall being pivoted up and away from a base of the dehydrator.

FIG. 14 shows the back wall 16 being pivoted up and away from the base 26 of the dehydrator 10.

FIG. 15 shows the back wall 16 being raised to be vertical to the base 26 and shows the plurality of trays 86 within the well 84 that is defined within the base 26.

FIG. 16 shows folding side walls 18, 20 extending away from the upright back wall 16 of the dehydrator, and shows the enclosure opening 34 defined within the back wall 16 to permit ambient air to flow in the collapsible enclosure 80.

Figure 17:
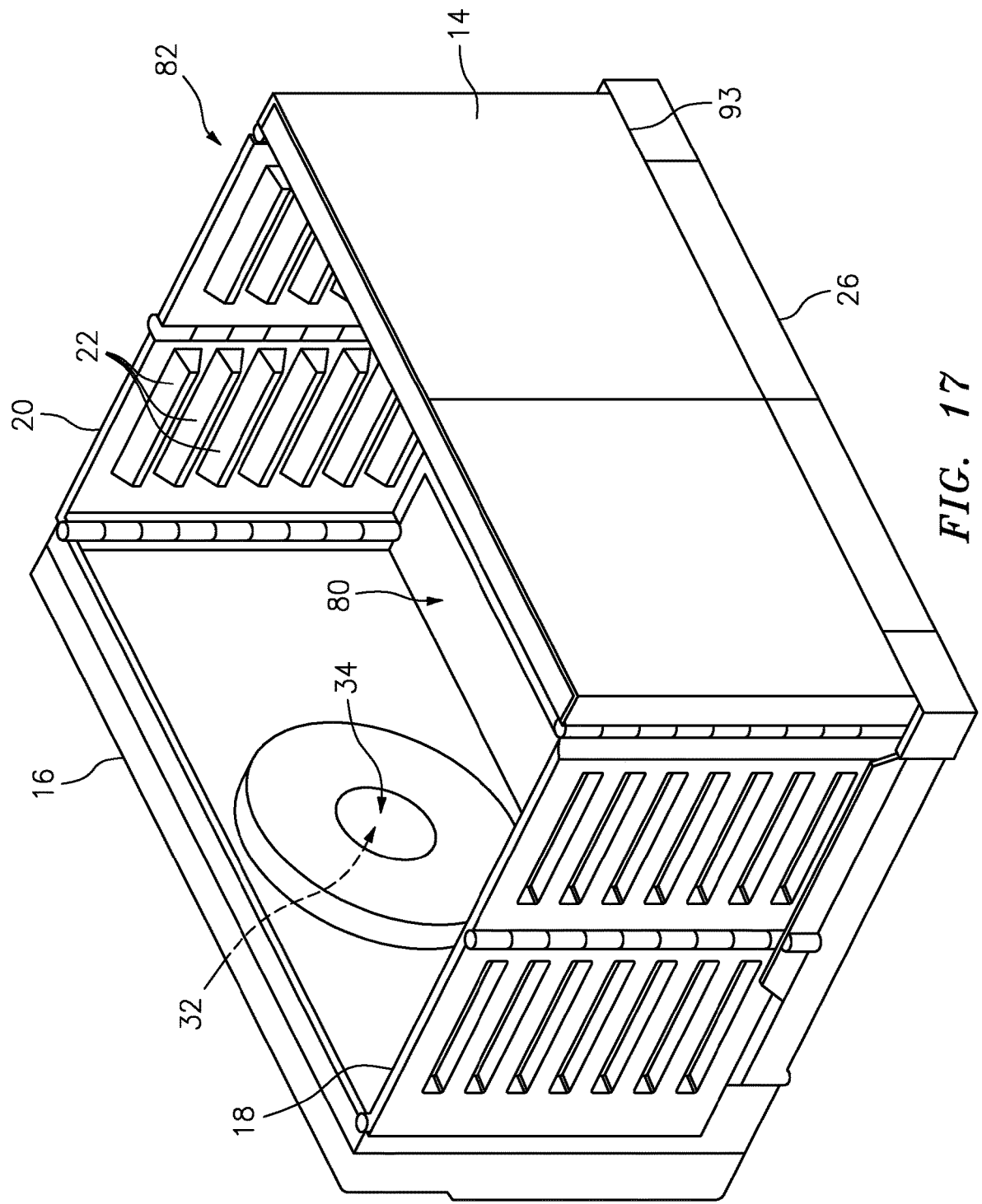
FIG. 17 is a front, raised perspective view of the FIG. 16 dehydrator showing the folding side walls fully extended to define an enclosure between the side walls, back wall and front wall.

FIG. 17 the folding side walls 18, 20 fully extended to define the collapsible enclosure 80 between the side walls 18, 20, back wall 16 and front wall 14, so that the collapsible middle member 82 is fully uncollapsed. Additionally, FIG. 17 shows that a bottom edge of the front wall rests upon the shelf 93 of the base 26 to secure the front wall against inadvertent movement.

Figure 18:
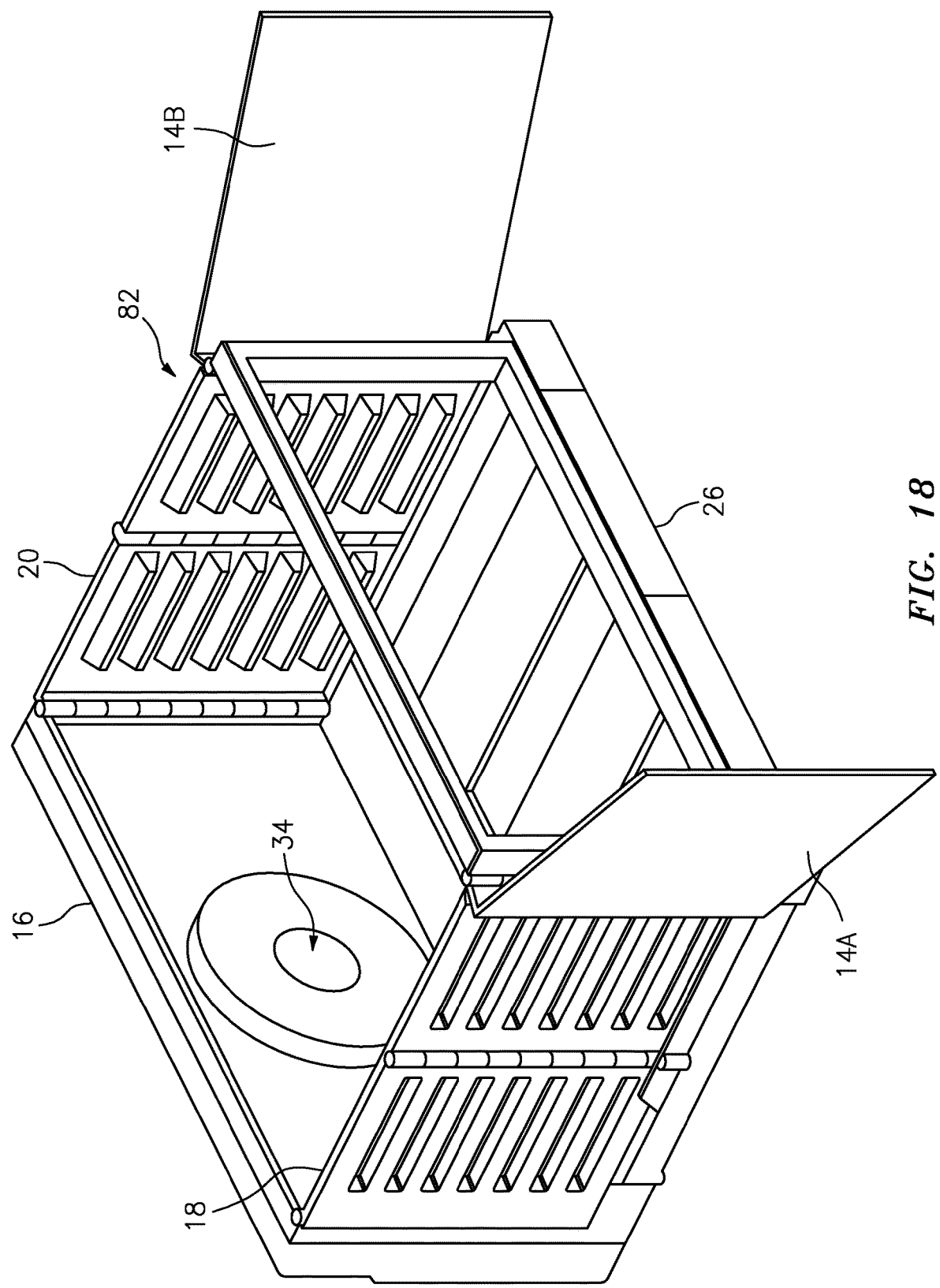
FIG. 18 is a front, raised perspective view of the FIG. 17 dehydrator showing the front wall as double glass pieces secured by hinges to outer edges of the two opposed side walls.
Figure 19:
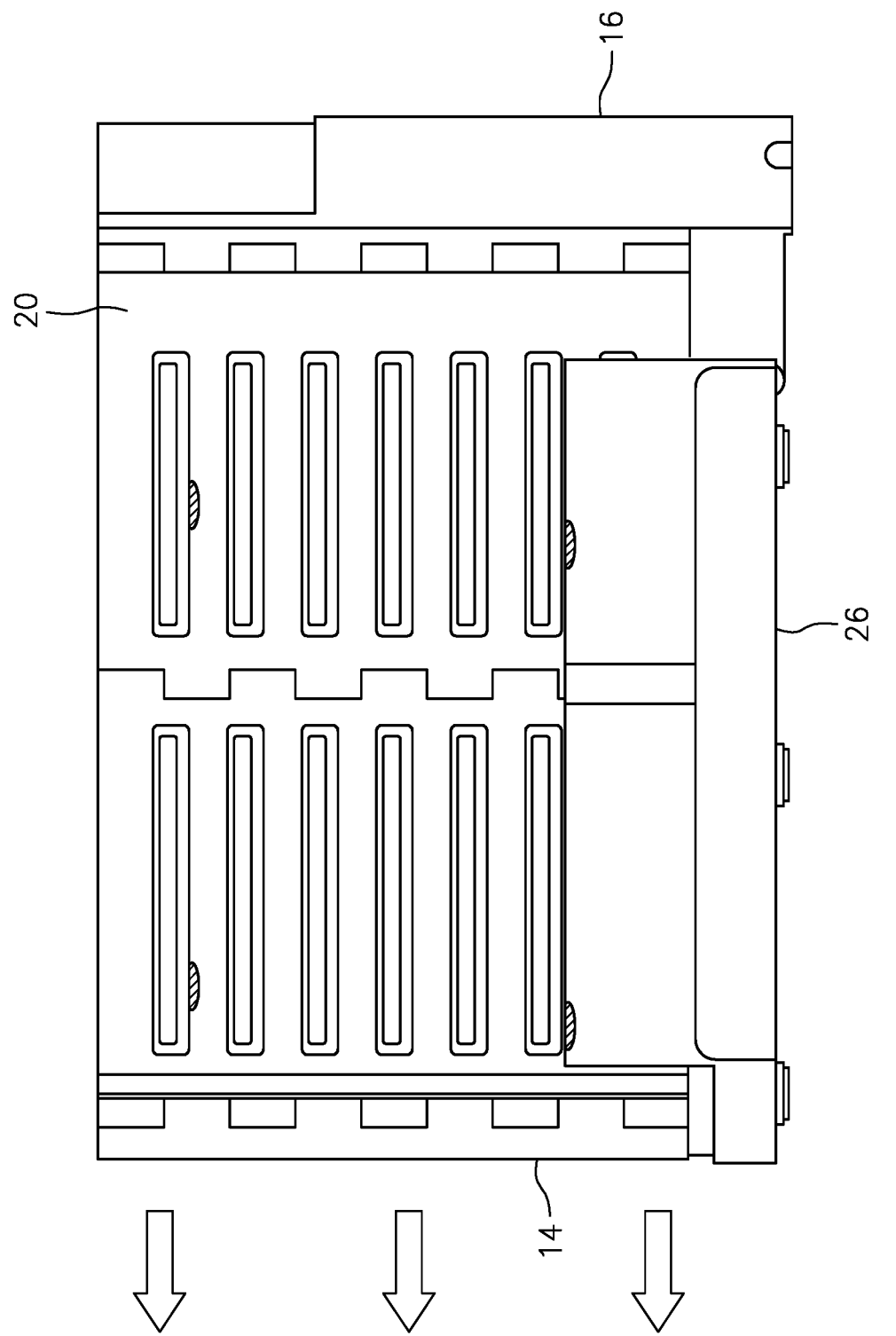
FIG. 19 is a side schematic view of the FIG. 14 dehydrator showing the enclosure of the dehydrator in an assembled configuration.

FIG. 18 shows the front wall 14 as double glass pieces 14A, 14B secured by hinges to outer edges of the two opposed side walls 18 20. FIG. 19 shows a side view of the collapsible enclosure 82 of the dehydrator 10 in an assembled configuration but without the cover 28 in place.

FIG. 20A shows the cover 28 removed from the collapsible embodiment 80 of the enclosure, and shows an extendable shelf 98 folded adjacent a front edge of the cover 28. Also shown is the securing strut 90 adjacent the extendable shelf 98, and a rotary latch 88A securing the securing strut 90 adjacent the extendable shelf 98.

FIG. 20B shows the rotary latch 88a rotated to unsecure the extendable shelf 98, and shows the extendable shelf 98 partially unfolded securing strut 90 pivotally secured to a leading edge of the extendable shelf 98.

FIG. 20C shows the extendable shelf 98 fully extended, and also shows 180 degree turn arrows 100A, 100B at opposed ends of the cover 28. These show how the cover 28 is to be re-positioned upon top edges of the front wall 14, side walls 18, 20 and back wall 16 of the collapsible middle member 82.

Figure 21:
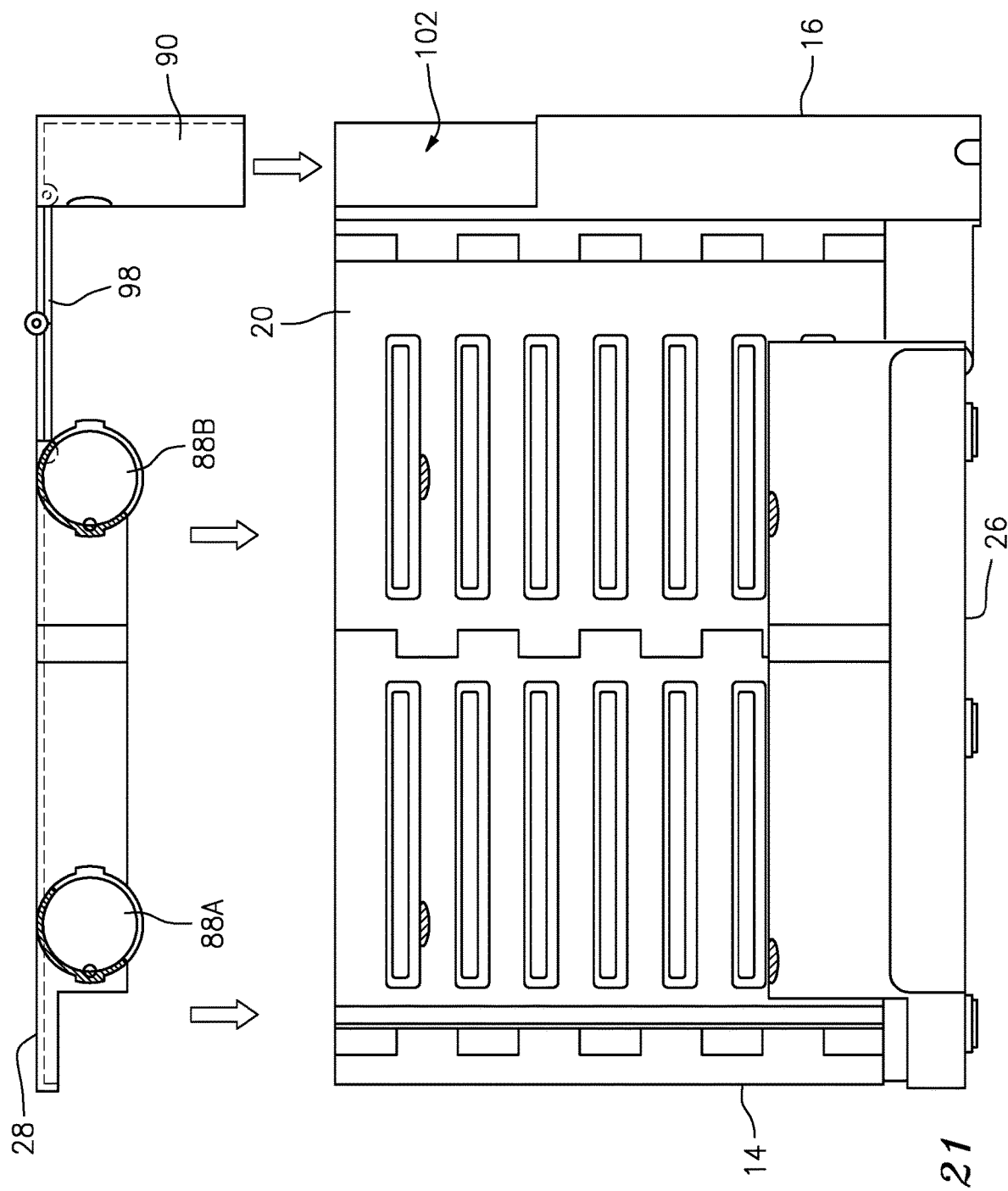
FIG. 21 is a side schematic view of the FIG. 19 view of the enclosure of the dehydrator and showing the cover of FIG. 20C rotated 180 degrees and positioned above the enclosure.

FIG. 21 shows the cover 28 with the extendable shelf 98 fully extended, and with the cover 28 rotated 180 degrees from the position shown in FIG. 20C. The cover is also positioned above the collapsible middle member 82.

FIG. 22 shows the cover secured upon the top edges of the collapsible middle member 82, and shows the securing strut 90 of the cover 28 within the securing slot 102 defined in the back wall 16 of the collapsible middle member 82 that defines the collapsible enclosure 80 of the collapsible embodiment of the dehydrator 10.

Figure 24:
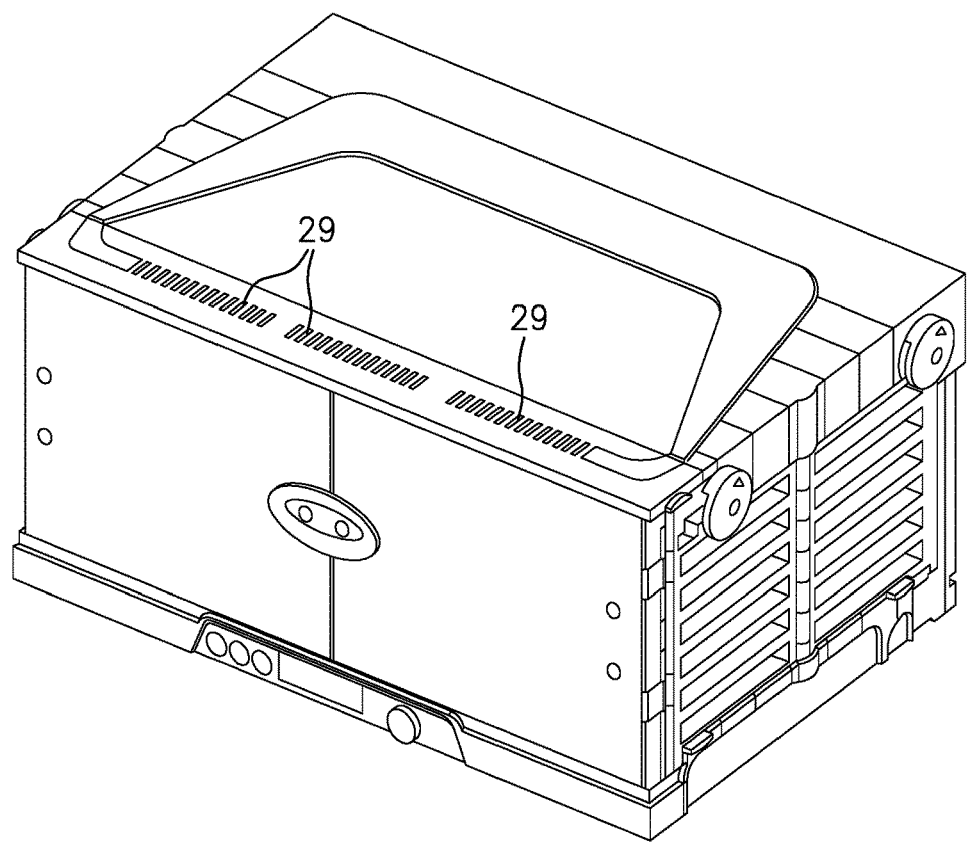
FIG. 24 is a top perspective view of the energy and space saving dehydrator of the present invention and showing air exhaust slits for permitting recycling air within the enclosure of the dehydrator to exit the enclosure through the air exhaust slits.

FIG. 23 shows the collapsible enclosure embodiment of the dehydrator 10 in a fully assembled configuration with a power cord 104 extending from the dehydrator 10. Also shown is rotation of the rotary latches 88A, 88B to lock the cover 28 onto upper edges of the collapsible middle member 82. FIGS. 24-26 have been discussed above with respect to other components of the energy and space saving dehydrator 10.

There has been provided a disclosure of an energy and space saving dehydrator 10. While the energy and space saving dehydrator 10 has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An energy and space saving dehydrator for dehydrating food, the dehydrator comprising:
   a. an enclosure having a front wall and an opposed back wall, a first side wall extending between first exterior side edges of the front and back walls, a second side wall extending between second exterior side edges of the front and back walls wherein the first and second side walls include a plurality of opposed horizontal ridges configured to support a plurality of trays upon the opposed horizontal ridges for supporting food to be dehydrated on the trays, a base extending between bottom edges of the front, back and side walls, a cover extending between top edges of the front, back and side walls to define the enclosure between the base the walls and the cover to enclose the trays, and at least one of the base, walls and cover defining one or more exit slits for permitting passage of heated air out of the enclosure;
   b. a dual-inlet heater fan secured to one of the walls and the cover, the dual-inlet heater fan including a first fan inlet positioned adjacent an enclosure opening defined within one of the walls and the cover of the enclosure, the first fan inlet configured for drawing and heating ambient air from outside the enclosure into the enclosure, and the dual-inlet heater fan defining a second fan inlet positioned within the enclosure for recycling and heating air within the enclosure;
   c. a first temperature sensor secured within the enclosure and adjacent an outlet of the dual-inlet heater fan for sensing a temperature of heated air passing out of the dual-inlet heater fan, and a second temperature sensor secured adjacent the second fan inlet for sensing a temperature of recycled air passing into the second fan inlet of the dual-inlet heater fan; and,
   d. a controller secured in communication with the first temperature sensor and with the second temperature sensor, the controller configured to limit a predetermined maximum temperature of the heated air passing out of the dual-inlet heater fan sensed by the first temperature sensor and a predetermined set point temperature of the recycled air sensed by the second temperature sensor, and the controller is also configured so that the controller controls the heater of the dual-inlet heater fan to be in an on position producing heat responsive to the temperature of the recycled air sensed by the second temperature sensor being less than the predetermined set point temperature of the recycled air.

2. The energy and space saving dehydrator of claim 1, wherein the enclosure includes a variable sized opening adjacent the first fan inlet, the variable sized opening being in communication with the controller for varying a size of the opening and thereby varying an amount of ambient air passing through the first fan inlet.

3. The energy and space saving dehydrator of claim 1 wherein the dual-inlet heater fan is secured in communication with the controller and the controller is configured to increase and decrease a flow rate of the recycled and ambient air flowing through the dual-inlet heater fan.

4. The energy and space saving dehydrator of claim 1 wherein the dual-inlet heater fan includes a plurality of rotatable, air moving fins that are curved backwards in a direction opposed to a direction the fins move air while rotating, to thereby decrease noise generated by the plurality of rotatable, air moving fins.

5. The energy and space saving dehydrator of claim 4 wherein the plurality of rotatable, air-moving fins are arranged in flat circle about a rotational axis of the fins, and wherein the fins define a fan central throughbore at the center of the circle and rotational axis of the fins, the heater fan also being configured so that a core of an electric motor that rotates the fins is secured within the fan central throughbore to thereby decrease a length of the dual-inlet heater fan, said fan length being parallel to the rotational axis of the plurality of rotatable, air moving fins.

6. The energy and space saving dehydrator of claim 1, wherein the dual-inlet heater fan includes a mounting plate secured to a suction side of the dual-inlet heater fan, the mounting plate also defining a mounting-plate throughbore dimensioned to surround the enclosure opening while the mounting plate secures the dual-inlet heater fan to one of the walls and cover of the enclosure to thereby permit the ambient air to pass through the mounting-plate throughbore into rotating fins of the dual-inlet heater fan; wherein the dual-inlet heater fan also includes a deflection plate secured in parallel disposition to the mounting plate and to an opposed side of the rotating fins to thereby deflect incoming ambient air to pass out of the fan in a direction parallel to and away from the plates, the deflection plate also defining a deflection-plate throughbore dimensioned to overlie a rotational axis of the rotating fins and to permit inflow of recycled, heated air within the enclosure through the deflection-plate throughbore and into contact with the rotating fins; and, wherein the heater of the dual-inlet heater fan is an electric resistance heater element secured between the mounting plate and the deflection plate and is positioned to be spaced apart from and at least partially surrounding the rotating fins.

7. The energy and space saving dehydrator of claim 1, wherein at least one pivot spacer is secured adjacent an exterior surface of the back wall, the pivot spacer being configured to pivot from a flush mounting within the back wall to a spacer mounting extending in a direction away from the back wall and from the enclosure to thereby prevent the enclosure from being positioned adjacent an ambient air blocking wall.

8. The energy and space saving dehydrator of claim 1, wherein the enclosure is a collapsible enclosure comprising:
   a. the dual-inlet heater fan being secured to the back wall adjacent the enclosure opening defined within the back wall;
   b. whenever the collapsible enclosure is in a collapsed configuration, the first and second side walls are folding walls, the front wall is pivotally secured to the folding side walls, and the back wall is pivotally secured to the base so that the side front and back walls form a collapsible middle member configured to be folded and pivoted to collapse to overlie and be adjacent to the base, and the cover is detachably secured to overlie the downwardly pivoted back wall; and,
   c. whenever the collapsible enclosure is in an assembled configuration, the folded side walls are pivoted away from the base and unfolded, the front wall is pivoted away from the side walls, the back wall is pivoted away from the base so that the collapsible middle member is uncollapsed to form a box-like shape, and the cover is detachably secured to top edges of the collapsible middle member to form the assembled configuration of the enclosure.

9. The energy and space saving dehydrator of claim 8, wherein the enclosure includes a variable sized opening adjacent the first fan inlet, the variable sized opening being in electrical communication with the controller for varying a size of the opening and thereby varying an amount of ambient air passing through the first fan inlet.

10. The energy and space saving dehydrator of claim 8 wherein the dual-inlet heater fan is secured in electrical communication with the controller and the controller is configured to increase and decrease a flow rate of the recycled and ambient air flowing through the dual-inlet heater fan.

11. The energy and space saving dehydrator of claim 8 wherein the dual-inlet heater fan includes a plurality of rotatable, air moving fins that are curved backwards in a direction opposed to a direction the fins move air while rotating, to thereby decrease noise generated by the plurality of rotatable, air moving fins.

12. The energy and space saving dehydrator of claim 11 wherein the plurality of rotatable, air-moving fins are arranged in flat circle about a rotational axis of the plurality of rotatable, air moving fins, and wherein the plurality of rotatable, air moving fins define a fan central throughbore at the center of the circle and rotational axis of the plurality of rotatable, air moving fins, the heater fan also being configured so that a core of an electric motor that rotates the plurality of rotatable, air moving fins is secured within the fan central throughbore to thereby decrease a length of the dual-inlet heater fan, said fan length being parallel to the rotational axis of the plurality of rotatable, air moving fins.

13. The energy and space saving dehydrator of claim 8, wherein the dual-inlet heater fan includes a mounting plate secured to a suction side of the dual-inlet heater fan, the mounting plate also defining a mounting-plate throughbore dimensioned to surround the enclosure opening while the mounting plate secures the dual-inlet heater fan to one of the walls and cover of the enclosure to thereby permit the ambient air to pass through the mounting-plate throughbore into rotating fins of the dual-inlet heater fan; wherein the dual-inlet heater fan also includes a deflection plate secured in parallel disposition to the mounting plate and to an opposed side of the rotating fins to thereby deflect incoming ambient air to pass out of the fan in a direction parallel to and away from the plates, the deflection plate also defining a deflection-plate throughbore dimensioned to overlie a rotational axis of the rotating fins and to permit inflow of recycled, heated air within the enclosure through the deflection-plate throughbore and into contact with the rotating fins; and, wherein the heater of the dual-inlet heater fan is an electric resistance heater element secured between the mounting plate and the deflection plate and is positioned to be spaced apart from and at least partially surrounding the rotating fins.

14. The energy and space saving dehydrator of claim 8, wherein at least one pivot spacer is secured adjacent an exterior surface of the back wall, the pivot spacer being configured to pivot from a flush mounting with the back wall to a spacer mounting extending in a direction away from the back wall and from the enclosure to thereby prevent the enclosure from being positioned adjacent an ambient air blocking wall.

15. The energy and space saving dehydrator of claim 8 wherein the base includes a well dimensioned to receive and hold the plurality of trays whenever the collapsible dehydrator is in the collapsed configuration, and wherein the trays are stainless steel screens.

16. The energy and space saving dehydrator of claim 8 wherein the front wall comprises one of a single glass piece secured by a hinge to a front edge of a side wall and double glass pieces hinged to front edges of the opposed side walls, and wherein the one of a single glass piece and double glass pieces include a latch for releasably securing the one of a single glass piece and double glass pieces to at least one of front edges of the base and the cover.

17. The energy and space saving dehydrator of claim 8 wherein the cover includes a rotary latch rotationally secured to each of four corners of the cover, and wherein each rotary latch is configured to rotate to secure the cover to latch tabs at corresponding corners of the base whenever the collapsible enclosure is in a collapsed configuration, and wherein each rotary latch is also configured to rotate to secure the cover to upper latch tabs at corresponding corners of the side walls whenever the collapsible enclosure is in an assembled configuration.

18. The energy and space saving dehydrator of claim 17, wherein the cover also includes an extendable shelf and a securing strut extending perpendicular to the shelf and toward the base, wherein the extendable shelf is configured to be secured in a non-extended position by the rotary latches secured to the front corners of the cover and wherein the securing strut extends from the extendable shelf to rest upon a protruding shelf of the base whenever the collapsible enclosure is in a collapsed configuration, wherein the rotary latches are configured to rotate to release the extendable shelf so that it may be released and extended whenever the collapsible enclosure is in an assembled configuration, and wherein the cover is configured to be rotated one-hundred and eighty degrees so that the securing strut may be secured within a receiving slot defined within the back wall of the dehydrator enclosure to secure the cover over the front, side and back walls.

* * * * *